(12) United States Patent
Takashima

(10) Patent No.: US 11,120,272 B2
(45) Date of Patent: Sep. 14, 2021

(54) IMAGING APPARATUS, ELECTRONIC DEVICE, AND METHOD OF TRANSMITTING IMAGE DATA

(71) Applicant: Panasonic Intellectual Property Management Co., Ltd., Osaka (JP)

(72) Inventor: Toru Takashima, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 206 days.

(21) Appl. No.: 16/035,600

(22) Filed: Jul. 14, 2018

(65) Prior Publication Data

US 2019/0065857 A1   Feb. 28, 2019

(30) Foreign Application Priority Data

Aug. 25, 2017 (JP) .............................. JP2017-162747
Jun. 19, 2018 (JP) .............................. JP2018-115815

(51) Int. Cl.
*G06K 9/00* (2006.01)
*H04N 5/232* (2006.01)
(Continued)

(52) U.S. Cl.
CPC ....... *G06K 9/00751* (2013.01); *G06F 16/739* (2019.01); *H04N 1/00204* (2013.01); *H04N 1/215* (2013.01); *H04N 1/2137* (2013.01); *H04N 5/23206* (2013.01); *H04N 5/23245* (2013.01); *H04N 2201/0049* (2013.01);
(Continued)

(58) Field of Classification Search
CPC .............. G06K 9/00751; G06F 16/739; H04N 1/00204; H04N 1/2137; H04N 1/215; H04N 5/23206; H04N 5/23245; H04N 2201/0049; H04N 2201/0075; H04N 2201/0084; H04N 5/23203; H04N 5/23216; H04N 5/23293; H04N 5/23296; H04N 5/23212;
(Continued)

(56) References Cited

FOREIGN PATENT DOCUMENTS

| JP | 2005-039626 | 2/2005 |
| JP | 2014-017560 | 1/2014 |
| JP | 2016-032302 | 3/2016 |

OTHER PUBLICATIONS

JP2014017560A Nagamine, mt (Year: 2014).*
JP2016032302A Mukai etal , mt (Year: 2016).*

* cited by examiner

*Primary Examiner* — Jianxun Yang
(74) *Attorney, Agent, or Firm* — Renner, Otto, Boisselle & Sklar, LLP

(57) ABSTRACT

An imaging apparatus to be remotely controlled by an external electronic device includes: a communication unit that communicates with the electronic device; an imaging unit that captures a moving image of a subject to generate moving image data from which still image data is to be extracted; a storage unit that stores, in a recording medium, the moving image data generated by the imaging unit; and a control unit that controls an operation of the imaging apparatus. The control unit performs a process of generating the moving image data in response to a first request from the electronic device and generating the still image data by extracting at least one frame image from the moving image data stored in the recording medium, in response to a second request from the electronic device, and causes the communication unit to transmit the generated still image data to the electronic device.

18 Claims, 24 Drawing Sheets

(51) Int. Cl.
*G06F 16/738* (2019.01)
*H04N 1/21* (2006.01)
*H04N 1/00* (2006.01)

(52) U.S. Cl.
CPC ............... *H04N 2201/0075* (2013.01); *H04N 2201/0084* (2013.01)

(58) Field of Classification Search
CPC ........ H04N 5/235; H04N 5/225; H04N 5/335; G03B 17/00; G03B 7/091
See application file for complete search history.

MARKER INFORMATION

| MARKER NUMBER | FRAME NUMBER |
|---|---|
| 1 | 11 |
| 2 | 20 |
| ... | ... |
| n | 115 |

IMAGING APPARATUS, ELECTRONIC DEVICE, AND METHOD OF TRANSMITTING IMAGE DATA

BACKGROUND

1. Technical Field

The present disclosure relates to an imaging apparatus that can generate moving image data from which still image data is to be extracted, an electronic device that remotely controls the imaging apparatus, and a method of transmitting image data from the imaging apparatus to the electronic device.

2. Description of the Related Art

Unexamined Japanese Patent Publication No. 2016-32302 discloses an imaging apparatus that captures a moving image in a mode suitable for a still image and then generates still image data by extracting frame images from the captured moving image. This configuration obviates the necessity for a user to care about a photo opportunity and successfully generates an image captured at a decisive moment, which has been conventionally difficult.

Unexamined Japanese Patent Publication No. 2014-17560 discloses an electronic device that communicates with an imaging apparatus through a universal serial bus (USB) connection. This electronic device gives an instruction to the imaging apparatus and acquires image data from the imaging apparatus. The electronic device includes a communication unit and a communication controller. The communication unit communicates with the imaging apparatus via a plurality of buffer areas and in conformity with a USB communication protocol. Those buffer areas correspond to respective endpoints in the imaging apparatus. Via a first buffer area of the buffer areas, the communication controller causes the communication unit to communicate with the imaging apparatus to acquire the image data. Via a second buffer area of the buffer areas, the communication controller causes the communication unit to transmit the instruction to the imaging apparatus. The instruction is at least one of an image capturing instruction to capture an image or a setting change instruction to change settings of an image capturing operation of the imaging apparatus. This configuration enables the electronic device to promptly transmit the instruction such as the image capturing instruction to the imaging apparatus through the USB communication even in the course of receiving large amounts of data such as image data through the USB communication.

SUMMARY

The present disclosure provides: an imaging apparatus and an electronic device; the imaging apparatus generates a still image from a captured moving image and transmits data on the generated still image data to the electronic device with improved convenience to a user.

A first aspect of the present disclosure is an imaging apparatus that is to be remotely controlled by an electronic device disposed outside the imaging apparatus. The imaging apparatus includes: a communication unit that communicates with the electronic device; an imaging unit that captures a moving image of a subject to generate moving image data from which still image data is to be extracted; a storage unit that stores, in a recording medium, the moving image data generated by the imaging unit; and a control unit that controls an operation of the imaging apparatus. The control unit receives a first request from the electronic device and, in response to the first request, performs a process of generating the moving image data. The control unit receives a second request from the electronic device and, in response to the second request, performs a process of generating the still image data by extracting at least one frame image from the moving image data stored in the recording medium. The control unit causes the communication unit to transmit the generated still image data to the electronic device.

A second aspect of the present disclosure is an electronic device that performs remote control of an imaging apparatus that generates moving image data from which still image data is to be extracted. The electronic device includes: a communication unit that communicates with the imaging apparatus; a recording medium in which the still image data generated from the moving image data in the imaging apparatus is retained; an operation unit through which a user enters an instruction for the remote control; and a control unit that controls an operation of the electronic device. The control unit causes the communication unit to transmit a first request to the imaging apparatus in response to an instruction of starting to capture an image which is entered through the operation unit. The first request is an instruction of generating the moving image data. The control unit receives, from the imaging apparatus, a notification that the generation of the moving image data has been completed and, in response to the notification, causes the communication unit to transmit a second request to the imaging apparatus. The second request is an instruction of extracting at least one frame image from the moving image data to generate the still image data. The control unit receives the still image data from the imaging apparatus and stores the received still image data in the recording medium.

A third aspect of the present disclosure is a method in which an imaging apparatus that is to be remotely controlled by an electronic device disposed outside the imaging apparatus transmits image data. The imaging apparatus receives a first request from the electronic device and, in response to the first request, captures a moving image to generate moving image data. The imaging apparatus receives a second request from the electronic device and, in response to the second request, extracts at least one frame image from the generated moving image data to generate still image data. The imaging apparatus causes the communication unit to transmit the generated still image data to the electronic device.

DETAILED DESCRIPTION

Exemplary embodiments will be described in detail below with reference to the drawings. In some instances, excessively detailed descriptions will be skipped. For example, the detailed description of already well-known matters or the overlap description of substantially identical configurations may be omitted. This is to avoid the following description from being unnecessarily redundant and thus to help those skilled in the art to easily understand the description.

The inventor provides the accompanying drawings and the following description such that those skilled in the art can sufficiently understand the present disclosure, and the subject matters of claims are not intended to be limited by the accompanying drawings and the following description.

First Exemplary Embodiment

With the accompanying drawings, a description will be given below of a configuration and operation of a digital camera, which may be an imaging apparatus in one exemplary embodiment of the present disclosure. The digital camera described below can capture moving images. This digital camera captures a moving image to generate moving image data that contains an image signal indicating the moving image and an audio signal recorded in synchronization with the moving image.

[1. Configuration]

Figure 1:
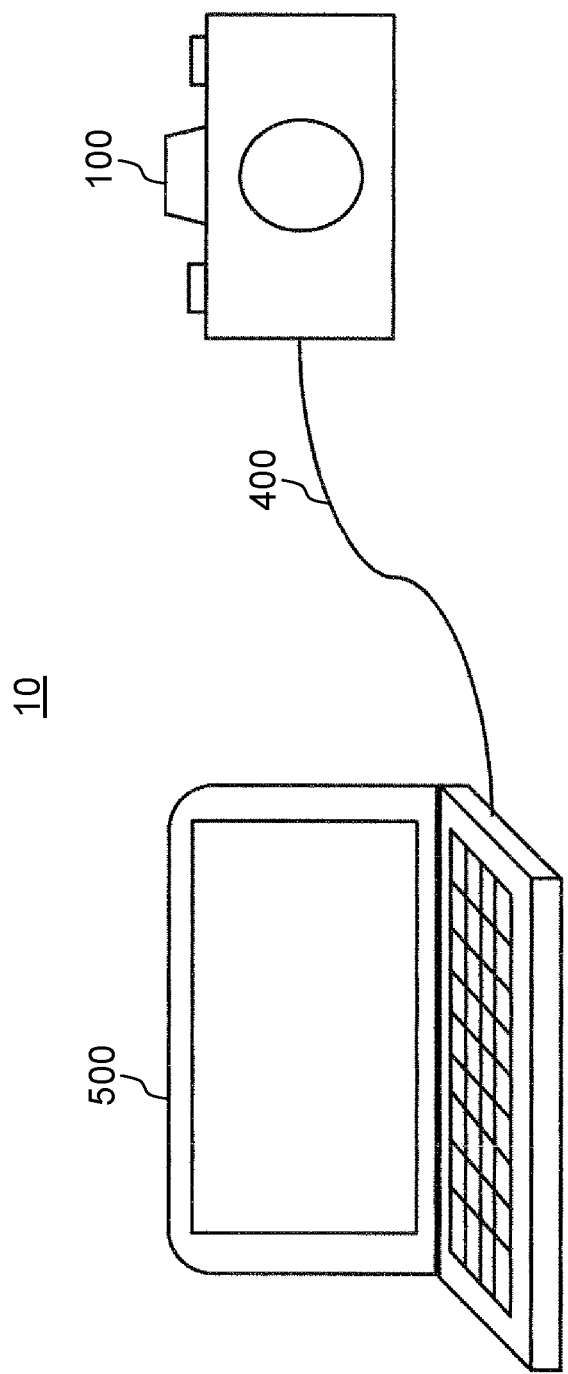
FIG. 1 schematically illustrates an imaging system of the present disclosure.

FIG. 1 schematically illustrates an imaging system in one exemplary embodiment of the present disclosure. Imaging system 10 includes digital camera 100 and personal computer 500. Personal computer 500 is abbreviated below as "PC 500". Digital camera 100 is an example of an imaging apparatus. PC 500 is an example of an electronic device. The electronic device is an information processing device. Digital camera 100 is connected to PC 500 via USB cable 400. PC 500 communicates with digital camera 100 in conformity with a picture transfer protocol, which is abbreviated below as a "PTP". Through this communication, PC 500 can remotely control digital camera 100 and acquire image data from digital camera 100.

[1-1. Digital Camera]

Figure 2:
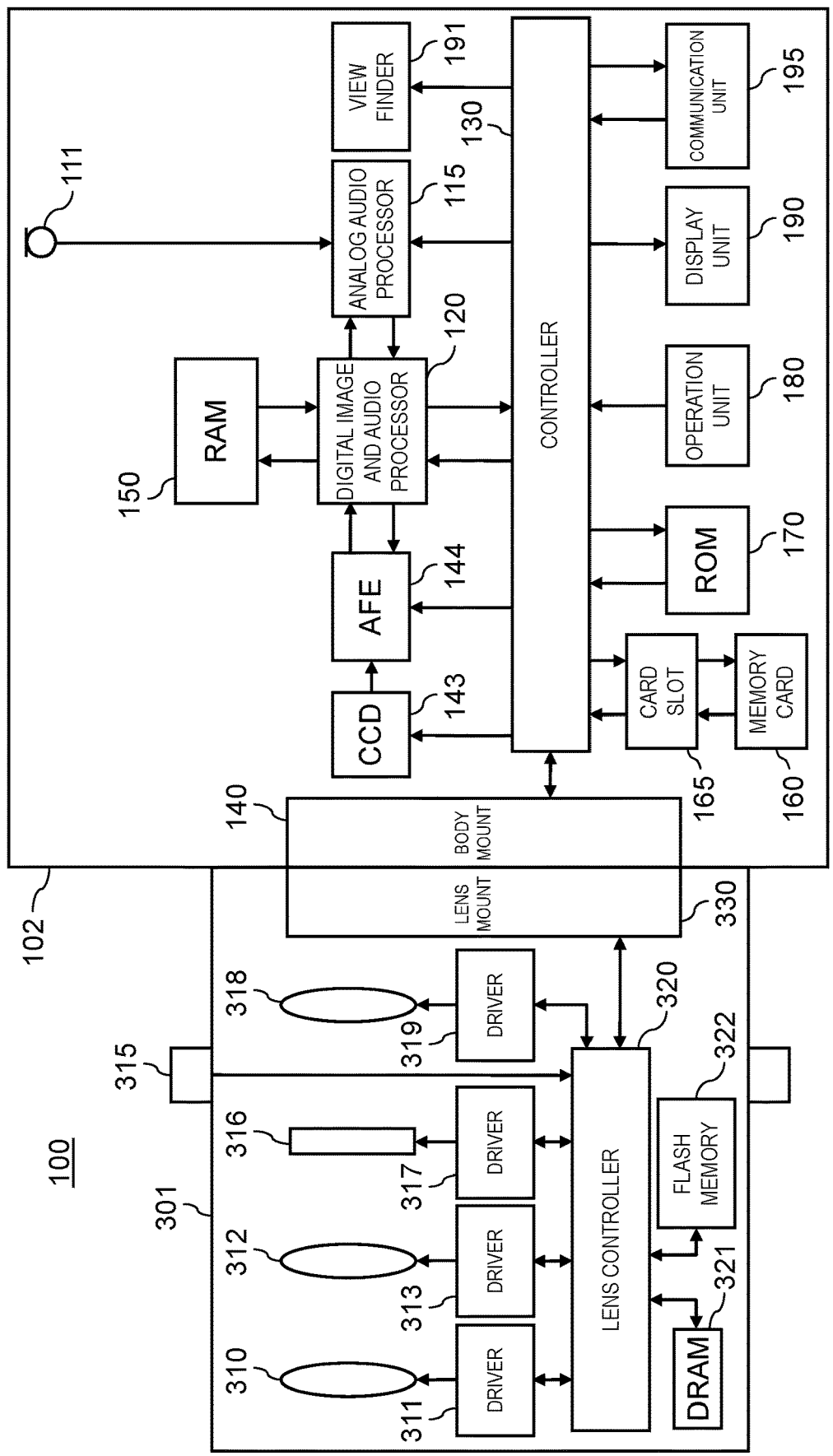
FIG. 2 is a block diagram illustrating an internal configuration of a digital camera of the present disclosure.

FIG. 2 is a block diagram illustrating an internal configuration of digital camera 100. Digital camera 100 captures at least one of still and moving images of a subject to generate image data and stores the image data in a recording medium. Thereinafter, the individual components of digital camera 100 will be described in detail.

As illustrated in FIG. 2, interchangeable lens 301 includes an optical system including focus lens 310, correcting lens 318, and zoom lens 312. Interchangeable lens 301 further includes lens controller 320, lens mount 330, focusing lens driver 311, zoom lens driver 313, diaphragm 316, diaphragm driver 317, operating ring 315, optical image stabilizer (OIS) driver 319, dynamic random access memory (DRAM) 321, and flash memory 322.

Lens controller 320 controls entire operation of interchangeable lens 301. Lens controller 320 causes focusing lens driver 311, OIS driver 319, and diaphragm driver 317 to drive focus lens 310, correcting lens 318, and diaphragm 316, respectively. Lens controller 320 receives a user's operation of operation ring 315 and causes zooming lens driver 313 to drive zooming lens 312 in accordance with the user's operation.

OIS driver 319 is provided with a drive mechanism that includes a magnet and a planar coil, for example. OIS driver 319 controls the drive mechanism, based on a detection signal of an unillustrated gyro sensor. Under this control, OIS driver 319 displaces correcting lens 318 in a plane vertical to an optical axis of the optical system in accordance with vibrations of interchangeable lens 301. In this way, OIS driver 319 can suppress the shaking of interchangeable lens 301 from affecting (e.g., blurring) images to be captured. In this case, the gyro sensor detects the shaking of interchangeable lens 301.

Lens controller 320, which is connected to both DRAM 321 and flash memory 322, writes or reads information into or from DRAM 321 and flash memory 322 as necessary. In addition, lens controller 320 communicates with controller 130 in camera body 102 via lens mount 330. Lens controller 320 may be implemented using a hard-wired electronic circuit or a microcomputer using a program, for example.

Lens mount 330 is coupled to body mount 140 of camera body 102 so that interchangeable lens 301 is mechanically and electrically connected to camera body 102. By connecting interchangeable lens 301 to camera body 102, lens controller 320 can communicate with controller 130. Body mount 140 in camera body 102 receives a signal from lens controller 320 via lens mount 330 and forwards this signal to controller 130.

Camera body 102 includes charge coupled device (CCD) image sensor 143, and analog front end (AFE) 144.

CCD image sensor 143 captures a subject image formed through interchangeable lens 301 and generates image information. Another kind of image sensor such as a complementary metal oxide semiconductor (CMOS) image sensor may be used as the image sensor.

AFE 144 reads the image information from CCD image sensor 143 and subjects this image information to noise suppression using correlated double sampling, amplification in conformity to an input range of an analog-digital (A/D) converter with an analog gain controller, and A/D conversion with the A/D converter.

Camera body 102 further includes built-in microphone 111 that picks up sound; built-in microphone 111 is an example of a sound input unit.

Built-in microphone 111 includes two microphone units that independently pick up main sounds (that is, sounds from a recording target) to be recorded which are coming from left and right directions. Each of the microphone units converts an audio signal into an electric signal, such as an analog audio signal. Then, each of the microphone units supplies the analog audio signal to analog audio processor 115.

When receiving the analog audio signal from built-in microphone 111, analog audio processor 115 amplifies this analog audio signal and converts the amplified analog audio signal into a digital audio signal. Then, analog audio processor 115 supplies this digital audio signal to digital image and audio processor 120.

Digital image and audio processor 120 receives the image information from AFE 144 and the audio signal from analog audio processor 115 and then subjects both the image information and the digital audio signal to various processes. For example, digital image and audio processor 120 subjects the image information to gamma correction, white balance correction, defect correction, encoding process, and other image processes, in accordance with an instruction from controller 130. In addition, digital image and audio processor 120 subjects the audio signal to various audio processes, in accordance with an instruction from controller 130. Digital image and audio processor 120 may be implemented using a hard-wired electronic circuit or a microcomputer that executes a program, for example. If digital image and audio processor 120 is implemented using a circuit, this circuit may be integrated into one or more semiconductor integrated circuits (ICs). Examples of digital image and audio processor 120 include a central processing unit (CPU), a field-programmable gate array (FPGA), an application specific integrated circuit (ASIC), and a digital signal processor (DSP).

Display unit 190 is mounted on a rear surface of digital camera 100. Display unit 190 may be implemented using a liquid crystal display (LCD) or an organic electro luminescence (EL) display, for example. Display unit 190 displays an image based on the image information processed by digital image and audio processor 120.

Viewfinder 191 is disposed in an upper portion of the rear surface of digital camera 100. Viewfinder 191 displays an image based on the image information processed by digital image and audio processor 120, which is similar to display unit 190. Both of display unit 190 and viewfinder 191 may display the images based on the image information at the same time, or only one of display unit 190 and viewfinder 191 may display the image.

Controller 130 integrally controls entire operation of digital camera 100. Controller 130 may be implemented using a hard-wired electronic circuit or a microcomputer that executes a program, for example. Furthermore controller 130 may be integrated with digital image and audio processor 120 and may be implemented using a single semiconductor chip. For example, controller 130 alone or integrated with digital image and audio processor 120 may be implemented using a CPU, a micro processing unit (MPU), FPGA, ASIC, DSP, or other IC.

Read only memory (ROM) 170 stores programs to be executed by controller 130. Controller 130 executes programs to integrally control the entire operation of digital camera 100, in addition to programs related to automatic focus control (AF control), automatic exposure control (AE control), or light emission control of an electronic flash. ROM 170 stores various conditions and settings related to digital camera 100. ROM 170 does not necessarily have to be mounted outside, namely, independently of controller 130. Alternatively, ROM 170 may be mounted inside controller 130. In this exemplary embodiment, ROM 170 is a flash ROM.

Random access memory (RAM) 150 functions as a working memory for digital image and audio processor 120 and controller 130. RAM 150 may be implemented using a synchronous dynamic random access memory (SDRAM) or a flash memory, for example. RAM 150 functions also as an internal memory in which the image information, the audio signal, and other data are stored.

Memory card 160 is a detachable recording medium having a built-in nonvolatile storage element such as a flash memory. For example, memory card 160 is a secure digital (SD) card. Memory card 160 is detachably inserted into card slot 165. Under the control of controller 130, card slot 165 stores the captured still or moving image data generated in the above manner in memory card 160 and in turn reads the captured still or moving image data from memory card 160. Card slot 165 is an example of a storage unit of the present disclosure.

Operation unit 180 is a general name of an operation interface such as an operation button and an operation dial disposed on an exterior of digital camera 100. Operation unit 180 receives a user's operation. Examples of operation unit 180 include a release button, a power switch, and a mode dial provided on an upper surface of digital camera 100, as well as a center button, a cross button, and a touch panel provided on the rear surface of digital camera 100. When receiving the user's operation, operation unit 180 supplies signals containing instructions for various operations to controller 130.

Communication unit 195 is a communication interface circuit that establishes connections with external devices in conformity with predetermined communication specifications. In this exemplary embodiment, communication unit 195 includes: an interface circuit and a connection terminal that enable communication conforming to USB specifications.

[1-2. PC]

Figure 3:
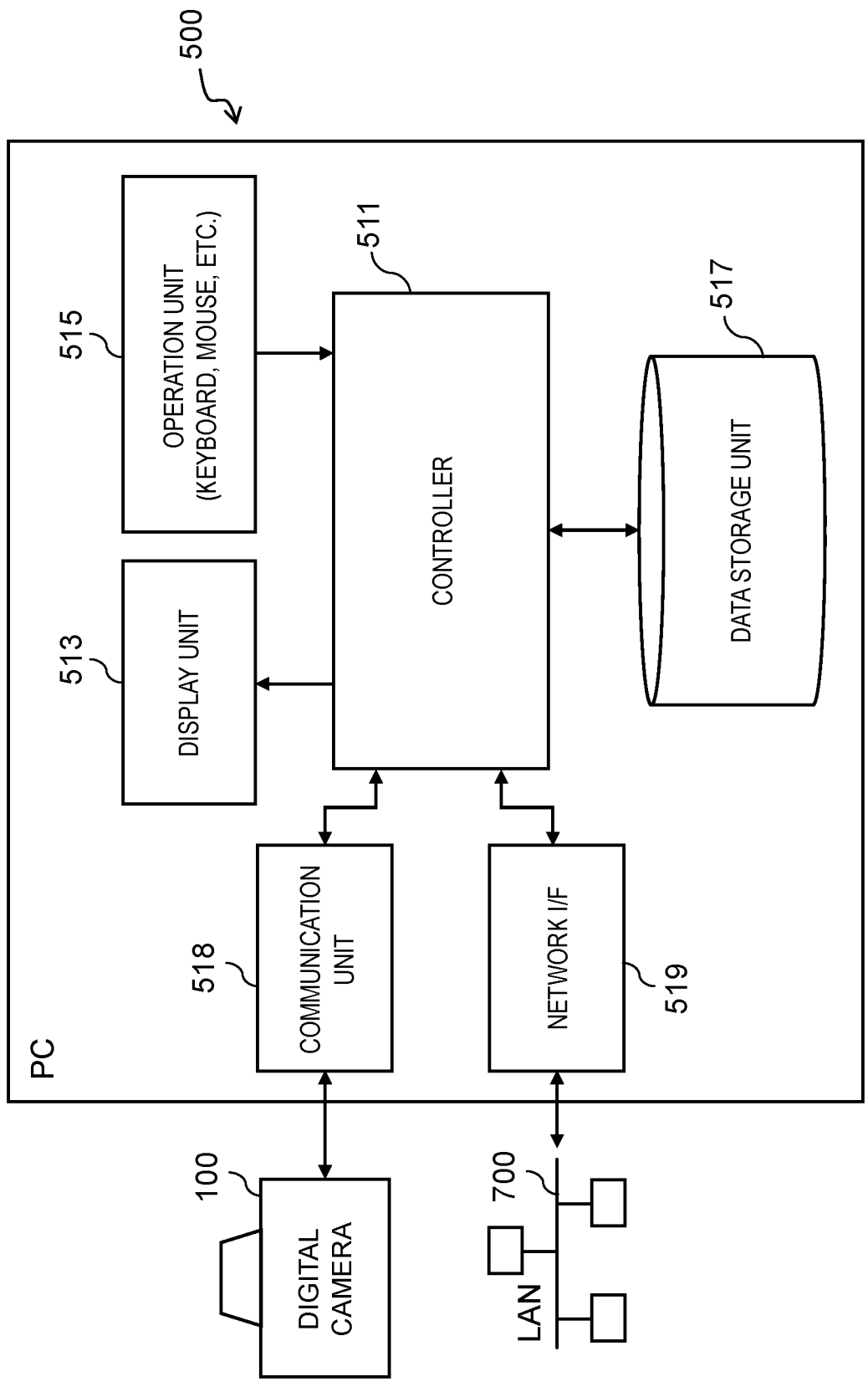
FIG. 3 is a block diagram illustrating an internal configuration of a personal computer (PC) of the present disclosure.

FIG. 3 is a block diagram illustrating an internal configuration of PC 500. PC 500 includes: controller 511 that controls entire operation of PC 500; display unit 513 that displays predetermined images on a screen; operation unit 515 to be operated by a user; and data storage unit 517 in which data and programs are stored.

Display unit 513 includes an LCD or an organic EL display, for example. Operation unit 515 is used by a user to give an instruction to PC 500. Examples of operation unit 515 include a keyboard, a mouse, and a touch panel.

Data storage unit 517 is a recording medium in which parameters, data, and programs that PC 500 requires to realize predetermined functions are stored. In data storage unit 517, control programs to be executed by controller 511 and various data are stored. Examples of data storage unit 517 include a hard disk (HDD), a solid state drive (SSD), and a flash memory. Controller 511, which is implemented using a CPU or MPU, realizes predetermined functions by executing predetermined control programs stored in data storage unit 517. Data storage unit 517 may acquire the control programs to be executed by controller 511 via a network or a recording medium such as a compact disk read-only memory (CD-ROM). Controller 511 may realize its functions by means of hardware alone or a combination of the hardware and software. In that sense, controller 511 can be implemented using, for example, a DSP, an FPGA, or an ASIC, as well as the CPU or the MPU.

PC 500 further includes communication unit 518 to be connected to an external device, which is digital camera 100 in this exemplary embodiment. Communication unit 518 includes an interface circuit and a connection terminal that enable communication with the external device in conformity with the USB specifications through which data or information is transmitted or received. PC 500 may further include network interface (I/F) 519 over which PC 500 is connected to network 700. Network I/F 519 is a circuit that performs communication in conformity with Institute of Electrical and Electronics Engineers (IEEE) 802.11 or wireless fidelity (Wi-Fi) specifications, for example.

[2. Operation]

Thereinafter, a description will be given of an operation of imaging system 10 employing the above configuration. Digital camera 100 captures a still image of a subject to generate still image data, and captures a moving image of the subject to generate moving image data. Then, digital camera 100 stores the still and moving image data in memory card 160 of digital camera 100. In accordance with a user's instruction, digital camera 100 transmits the still and moving image data from memory card 160 to PC 500.

[2-1. Remote Control of Digital Camera]

Imaging system 10 supports an extension function of the PTP and thus can remotely control digital camera 100 with PC 500. For that purpose, digital camera 100 is connectable to PC 500 via USB cable 400. Through the USB connection, PC 500 can cause digital camera 100 to capture an image or transmit the image data to PC 500, in response to a user's operation.

Figure 4:
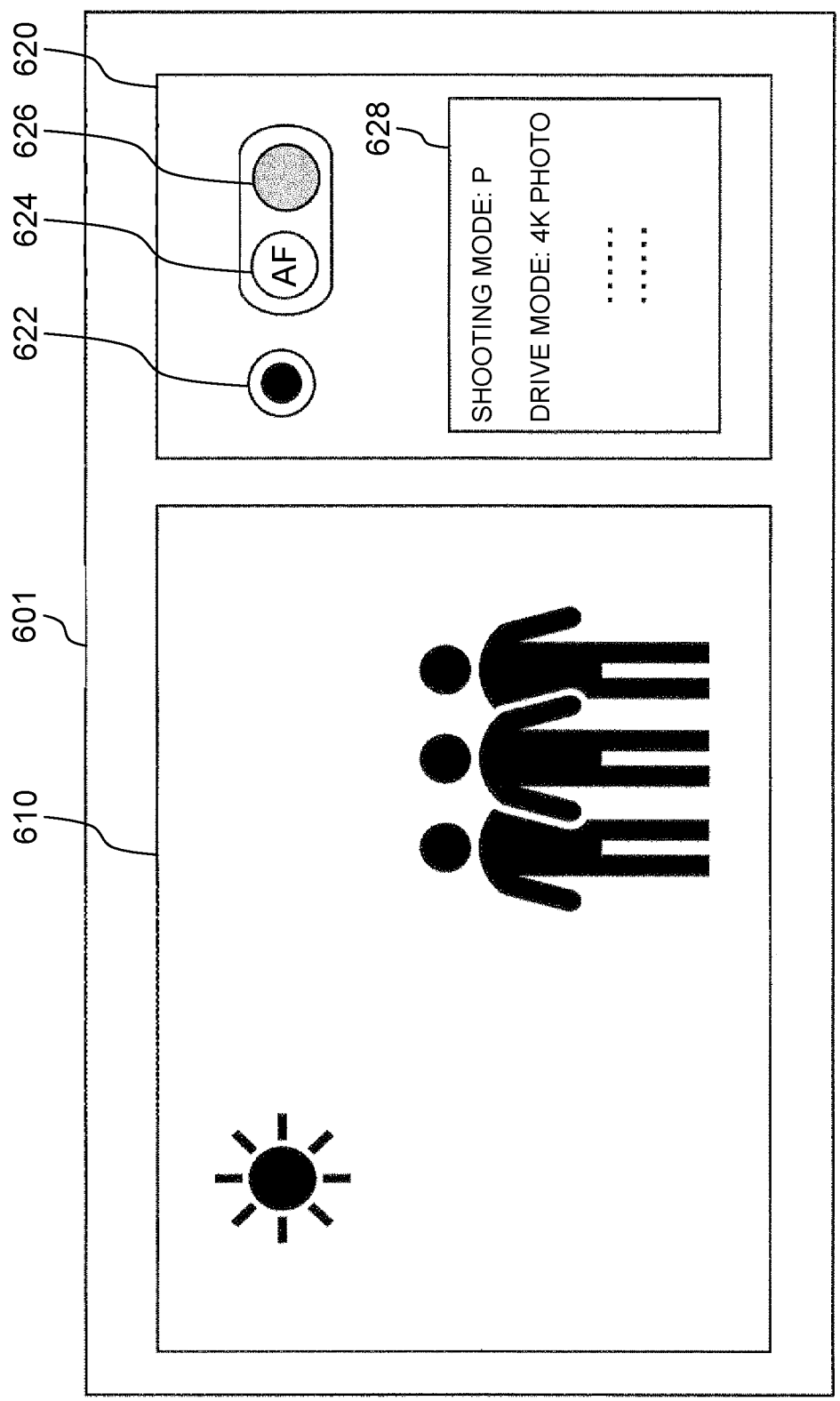
FIG. 4 illustrates a display screen of the PC which is used to remotely control an image capturing operation of the digital camera.

FIG. 4 illustrates an example of an image displayed on operation screen 601 of display unit 513 in PC 500 which is used to remotely control digital camera 100. Operation screen 601 contains region 610 in which a moving image that CCD 143 of digital camera 100 is capturing or will capture appears in a real time or a live view manner. Operation screen 601 further contains region 620 in which moving image button 622, autofocus (AF) button 624, and still image button 626 appear. Moving image button 622, autofocus (AF) button 624, and still image button 626 are used by a user to give instructions to digital camera 100. Moving image button 622 is used to enter an instruction of starting or terminating the capturing of the moving image. AF button 624 is used to enter a setting of activating or disabling an autofocus function. Still image button 626 is used to enter an instruction of capturing a still image. In region 620, various setting conditions 628 further appear. Examples of setting conditions 628 include a shutter speed, an exposure, a photographic mode (P/A/S/M), a drive mode (a single shooting mode, a continuous shooting mode, or a 4K photo mode), and an image size.

[2-2. 4K Photo Mode]

To capture a still image, digital camera 100 can operate either in a single shooting mode or in a continuous shooting mode. In the single shooting mode, digital camera 100 captures only one image in response to one operation. In the continuous shooting mode, digital camera 100 sequentially captures a plurality of images in response to one operation. In addition to the single and continuous shooting modes, digital camera 100 can operate in a 4K photo mode. In the 4K photo mode, digital camera 100 can capture a moving image at a high resolution, such as a 4K or 6K image. This high-resolution moving image may be referred to below as the "4K photo moving image". After having captured the 4K photo moving image, digital camera 100 extracts a desired one from frame images making up the 4K photo moving image, thereby generating a still image, for example, as described in Unexamined Japanese Patent Publication No. 2016-32302. To capture a moving image, digital camera 100 can also operate in a normal moving image mode as the drive mode. In this exemplary embodiment, thus, digital camera 100 can capture a moving image either in the 4K photo mode or in the normal moving image mode.

Figure 5:
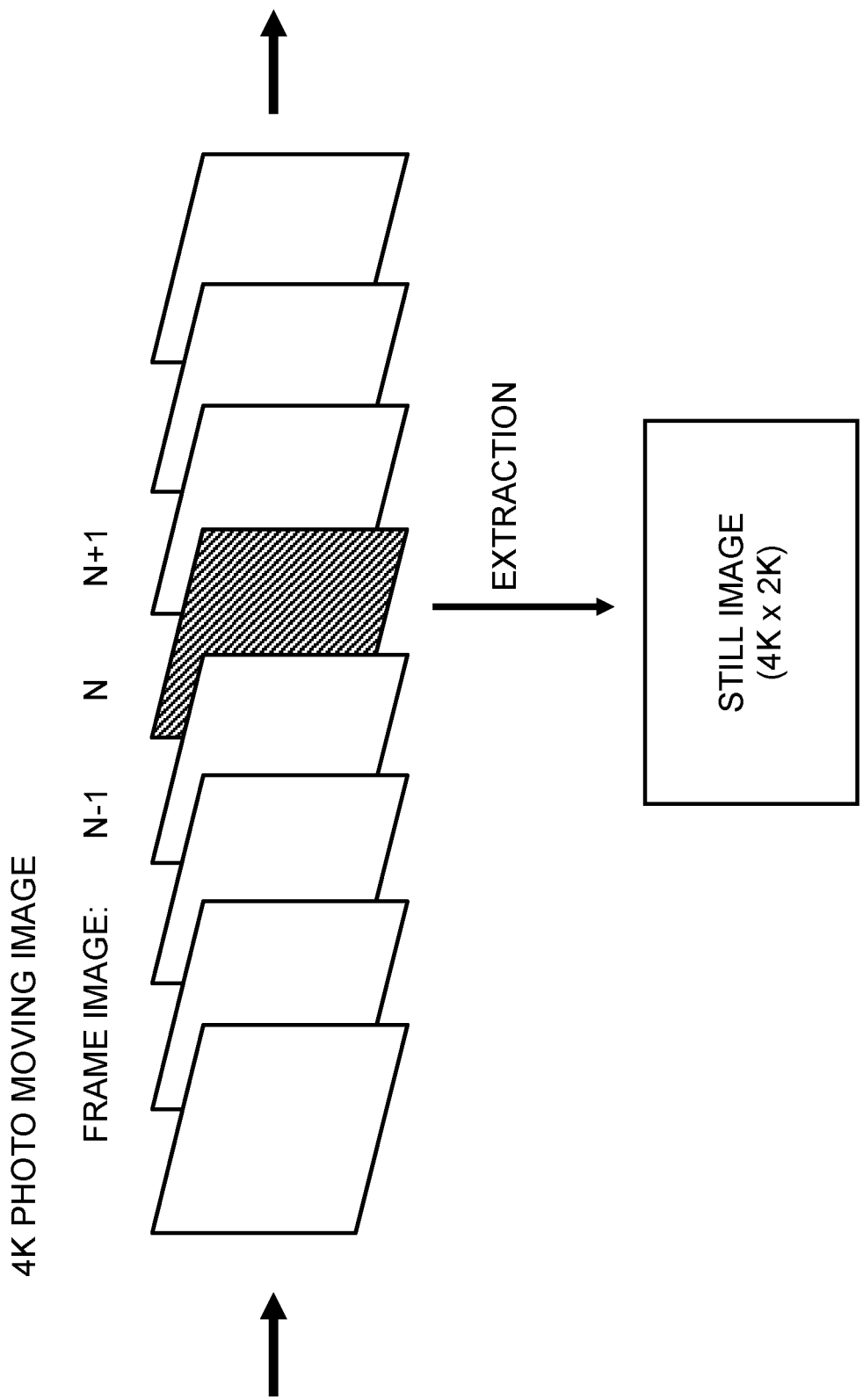
FIG. 5 schematically illustrates a 4K photo mode.

FIG. 5 illustrates a method in which digital camera 100 generates a still image from a 4K photo moving image. The 4K photo moving image is made up of a plurality of temporally sequential frame images. Digital camera 100 extracts a desired one from the frame images making up the 4K photo moving image, thereby generating still image data. By extracting, as a still image, the frame image containing a desired scene from the moving image in this manner, digital camera 100 obviates the necessity for a user to care about a photo opportunity and successfully generates an image captured at a decisive moment, which has been conventionally difficult. Consequently, digital camera 100 can easily capture an image of an unexpected accident or happening or an image of an instantaneous state of a time-varying subject, such as flowing fluid or flame.

Digital camera 100 captures a 4K photo moving image and extracts one or more frame images from the 4K photo moving image as still images. In this case, digital camera 100 puts a higher premium on quality of the still images to be extracted than quality of the 4K photo moving image. More specifically, when set to the 4K photo mode, digital camera 100 may automatically adjust various photographic parameters so as to be suitable for capturing still images, for example, as described in Unexamined Japanese Patent Publication No. 2016-32302. For example, in the normal moving image mode, digital camera 100 sets a resolution of an image to be captured to a value specified by a user in a range from a video graphics array (VGA) to 4K (about 4000 pixels×about 2000 pixels). In contrast, in the 4K photo mode, digital camera 100 sets a resolution of an image to be captured to a maximum settable value, such as 4K or 6K. Digital camera 100 thereby can store quality frame images and extract quality still images.

[2-3. USB Connection Mode]

When connected to an external device such as PC 500 via USB cable 400, digital camera 100 operates in a predetermined mode, which may be referred to below as a "USB connection mode". The USB connection mode is one selected from the following three modes.

1) PC mode: digital camera 100 operates as a reader for memory card 160. In the PC mode, the external device can read data stored in memory card 160.

2) PictBridge mode: digital camera 100 causes a printer to print images stored in memory card 160. In the PictBridge mode, the printer connected directly to digital camera 100 prints images stored in digital camera 100.

3) Remote control mode: digital camera 100 is remotely controlled by PC 500. In the remote control mode, digital camera 100 communicates with PC 500 in accordance with the PTP.

In short, digital camera 100 is set to one of the above three modes as the USB connection mode.

[2-4. Process of Establishing USB Connection]

With reference to a flowchart of FIG. 6, a description will be given of a process that digital camera 100 performs when connected to an external device via USB cable 400.

Figure 6:
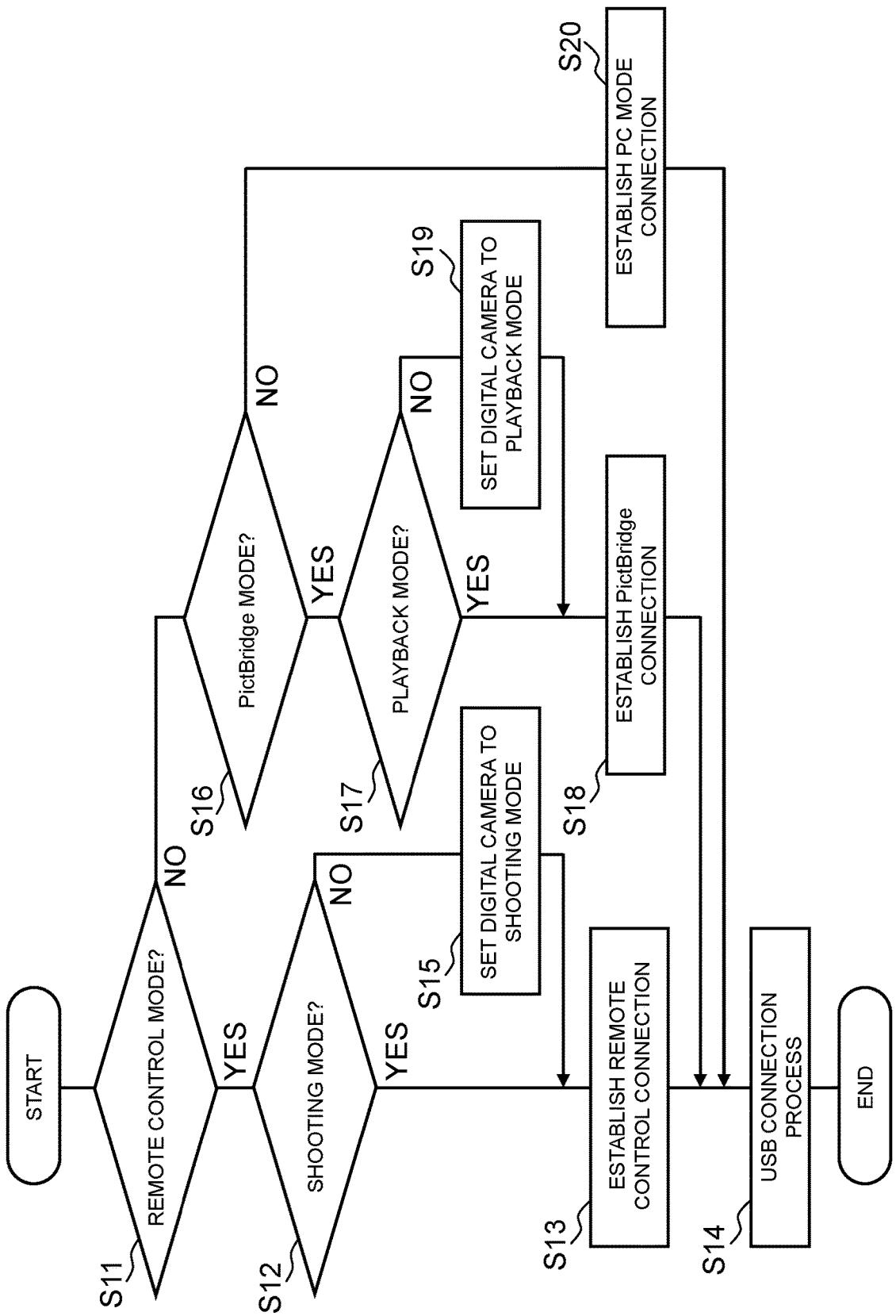
FIG. 6 is a flowchart of a process of establishing a USB connection of the digital camera.

As illustrated in FIG. 6, at steps S11 and S16, controller 130 in digital camera 100 identifies to which mode digital camera 100 is set as the USB connection mode.

When digital camera 100 is set to the remote control mode as the USB connection mode (YES at step S11), at step S12, controller 130 determines whether digital camera 100 is set to the shooting mode. When digital camera 100 is not set to the shooting mode (NO at step S12), at step S15, controller 130 sets digital camera 100 to the shooting mode.

At step S13, controller 130 establishes a remote control connection. To establish the remote control connection, controller 130 performs the following setting steps, for example.

1) Set DeviceDescriptor

Controller 130 sets a vendor ID to a RemoteControl ID.

2) Set ConfigurationDescriptor

Controller 130 sets Class, Subclass, and Protocol so as to be suitable for a still image.

3) PTP: set a GetDeviceInfo response

Controller 130 sets a command, an event, and device property definition, as extensions for the remote control mode.

When digital camera 100 is set to the PictBridge mode as the USB connection mode (NO at step S11 and YES at step S16), at step S17, controller 130 determines whether digital camera 100 is set to a playback mode. When digital camera 100 is not set to the playback mode (NO at step S17), at step S19, controller 130 sets digital camera 100 to the playback mode.

At step S18, controller 130 establishes a PictBridge connection. To establish the PictBridge connection, controller 130 performs the following setting steps, for example.

1) Set DeviceDescriptor

Controller 130 sets a vendor ID to a PictBridge ID.

2) Set ConfigurationDescriptor

Controller 130 sets Class, Subclass, and Protocol so as to be suitable for a still image.

3) PTP: set a GetDeviceInfo response

Controller 130 sets a PTP command, an event, and device property to be used for PictBridge.

When digital camera 100 is set to neither the remote control mode nor the PictBridge mode as the USB connection mode (NO at steps S11 and S16), namely, when digital camera 100 is set to the PC mode, at step S20, controller 130 establishes a PC mode connection. To establish the PC mode connection, controller 130 performs the following setting steps, for example:

1) Set DeviceDescriptor

Controller 130 sets the vendor ID to a PC mode ID.

2) Set ConfigurationDescriptor

Controller 130 sets Class, Subclass, and Protocol in a mass storage class so as to be suitable for bulk only transport.

After having established the remote control connection at step S13, the PictBridge connection at step S18, or the PC mode connection at step S20, at step S14, controller 130 performs a USB connection process to establish USB communication between USB devices in conformity with USB specifications. This USB connection process may be a predetermined process conforming to the USB specifications by which USB communication is established between USB devices.

[2-5. Image Capturing Process]

A description will be given of an example of an operation of imaging system 10 in which a moving image is captured in the 4K photo mode and then still images are extracted from the 4K photo moving image and transmitted. In this example, digital camera 100 is set to the remote control mode and can be remotely controlled by PC 500 accordingly. In this case, the image capturing operation of digital camera 100 can be remotely controlled using still image button 626 or moving image button 622 displayed on operation screen 601, as illustrated in FIG. 4, of display unit 513 in PC 500.

Figure 7:
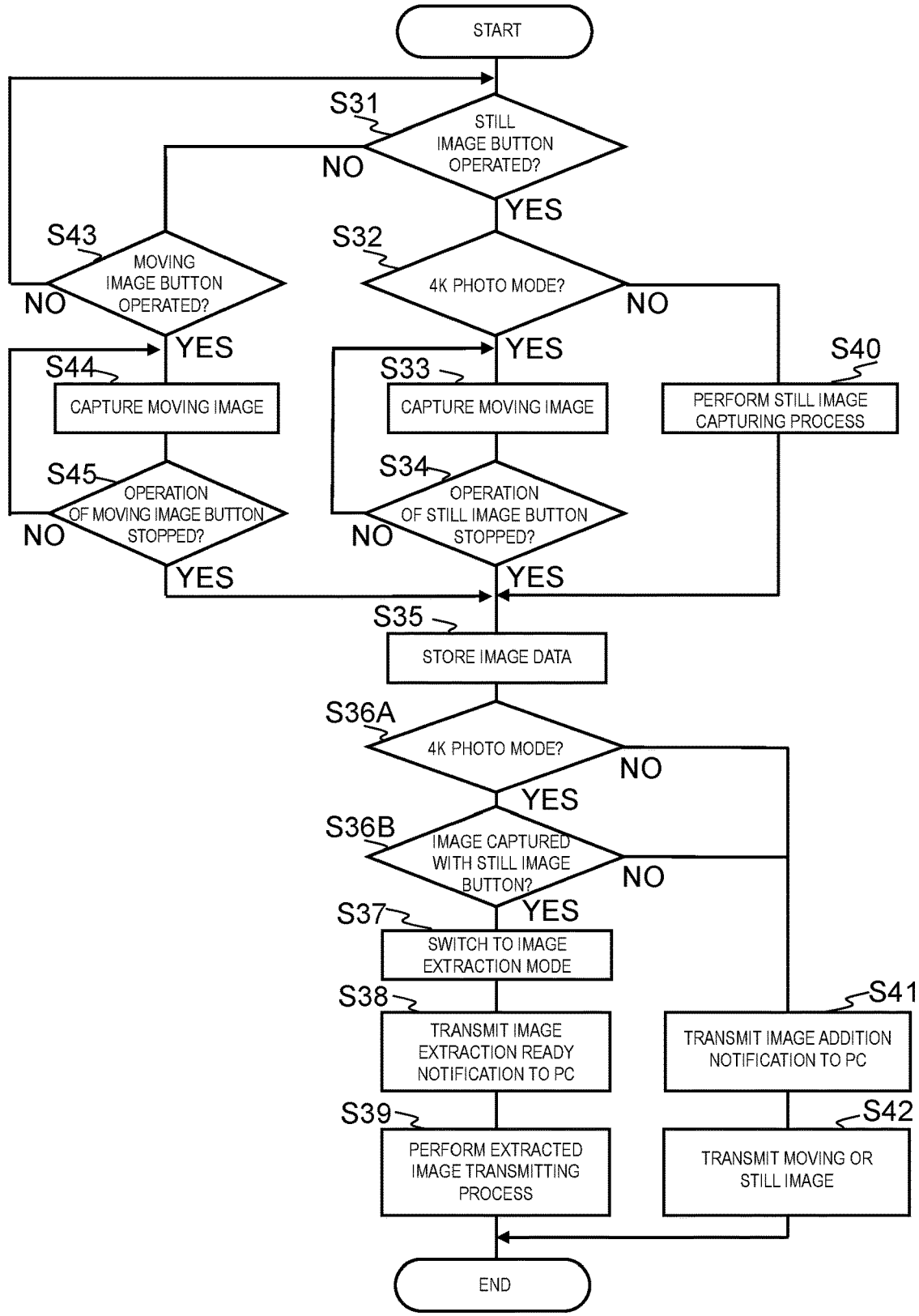
FIG. 7 is a flowchart of a process of capturing an image which is performed in response to an operation of a still or moving image button in the imaging system.

FIG. 7 is a flowchart of a process of capturing an image with imaging system 10. With reference to the flowchart of FIG. 7, the process of capturing an image will be described.

When a user operates still image button 626 to instruct PC 500 to capture a normal still image (YES at step S31), at step S32, controller 130 in digital camera 100 determines whether the drive mode is the 4K photo mode. When controller 130 determines that the drive mode is not the 4K photo mode (NO at step S32), at step S40, digital camera 100 performs a process of capturing a normal still image. More specifically, digital camera 100 generates still image data by subjecting an image signal generated by CCD 143 to a predetermined image process.

When controller 130 determines that the drive mode is the 4K photo mode (YES at step S32), at step S33, digital camera 100 starts capturing a 4K photo moving image. At Steps S33 and S34, digital camera 100 continues to capture the 4K photo moving image until the user stops operating still image button 626.

After having completed the process of capturing the moving or still image at Step S34 or S40, at step S35, digital camera 100 stores captured image data in memory card 160.

When controller 130 determines that the user does not operate still image button 626 at step S31 (No at step S31), at step S43, controller 130 determines whether the user operates moving image button 622 to instruct PC 500 to capture a normal moving image or a 4K photo moving image. When controller 130 determines that the user operates moving image button 622 (YES at step S43), at step S44, digital camera 100 starts capturing a moving image in a preset mode. For example, when the user keeps operating moving image button 622, digital camera 100 continues to capture the 4K photo moving image until the operation of moving image button 622 is stopped, at steps S44 and S45. After having completed the process of capturing the moving image (YES at step S45), at step S35, digital camera 100 stores data on the captured moving image in memory card 160.

Following step S35, controller 130 determines whether the drive mode of digital camera 100 is the 4K photo mode at step S36A.

When controller 130 determines that the drive mode is not the 4K photo mode (NO at step S36A), at step S41, digital camera 100 transmits, to PC 500, a notification that a new image has been added. Then, in response to a request from PC 500, at step S42, digital camera 100 transmits the generated data on the captured moving or still image to PC 500.

When controller 130 determines that the drive mode is the 4K photo mode (YES at step S36A), at step S36B, controller 130 determines whether the stored data on the moving image has been generated in response to the operation of still image button 626. When controller 130 determines that the stored data on the moving image has not been generated in response to the operation of still image button 626 (NO at step S36B), such as when the stored data on the moving image has been generated in response to the operation of moving image button 622, the processing proceeds to step S41 described above. When controller 130 determines that the stored data on the moving image has been generated in response to the operation of still image button 626 (YES at step S36B), at step S37, digital camera 100 switches from the shooting mode to an image extraction mode.

After having switched to the image extraction mode, at step S38, digital camera 100 transmits an "image extraction ready notification" which indicates that digital camera 100 is ready to extract still images to PC 500. At step S39, digital camera 100 performs a process of transmitting data on the extracted images. More specifically, digital camera 100 extracts still images from the 4K photo moving image captured and stored in the 4K photo mode and transmits the data on the still images to PC 500.

[2-5-1. Transmission of Still Image Data]

Figure 8:
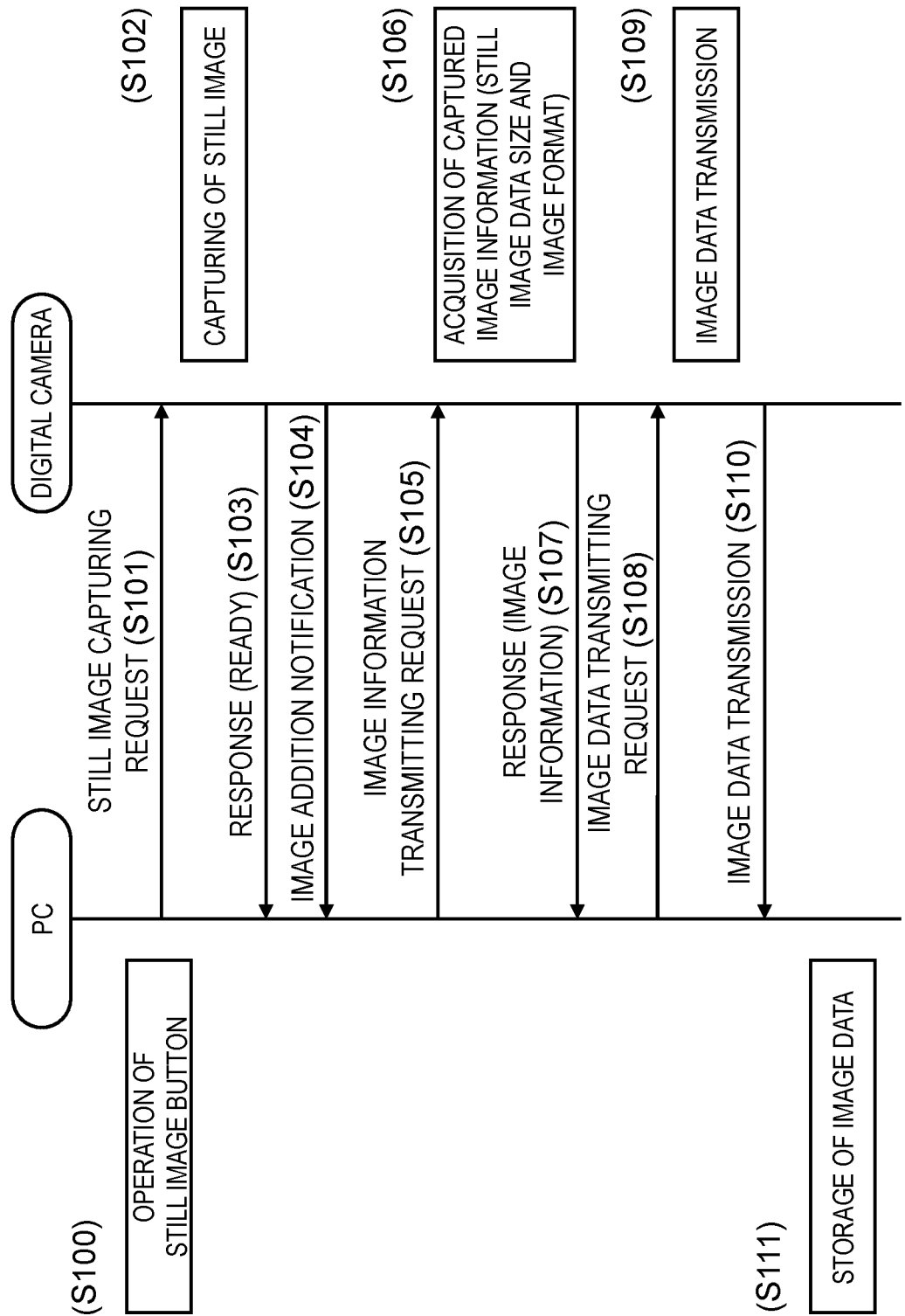
FIG. 8 is a sequence diagram illustrating exchange of information between the digital camera and the PC, in which the digital camera captures an image in a normal still image capturing mode and transmits data on the image.

With reference to FIG. 8, a description will be given below in detail of an example of a process by which information is exchanged between digital camera 100 and PC 500. In this example, digital camera 100 captures one or more still images in the still images shooting mode such as a single shooting mode or continuous shooting mode and then transmits data on the still images to PC 500.

When the user operates still image button 626 on operation screen 601 of PC 500 at step S100, at step S101, PC 500 transmits a request for capturing still images to digital camera 100. When receiving the request for capturing still images, digital camera 100 performs a process of capturing still images at step S102, and then notifies PC 500 of completion of this process as a response to the request, at step S103. At step S104, digital camera 100 transmits an image addition notification to PC 500 to inform that new images have been added. PC 500 receives the image addition notification and thereby can recognize that new captured images are added to digital camera 100.

At step S105, PC 500 transmits an image information transmitting request which is a request for transmitting information regarding the captured still images to digital camera 100. When receiving the image information transmitting request, at step S106, digital camera 100 acquires the information regarding the captured still images. More specifically, digital camera 100 acquires a data size, an image format, and other characteristics of the still images. In response to the image information transmitting request, at step S107, digital camera 100 transmits the image information containing the data size, the image format, and other characteristics of the still images to PC 500.

When receiving the image information, at step S108, PC 500 transmits image data transmitting request to digital camera 100 to request to transmit the data on the captured still images. When receiving the image data transmitting request, at steps S109 and S110, digital camera 100 sequentially transmits the pieces of data on the respective captured still images to PC 500. At step S111, PC 500 receives all the pieces of image data from digital camera 100 and stores the image data in data storage unit 517.

It should be noted that a process by which information is exchanged between digital camera 100 and PC 500 when digital camera 100 captures images in the moving image shooting mode and transmits the image data to PC 500 may be identical to the above-described process performed in the still image shooting mode.

[2-5-2. Transmission of Extracted Image Data]

Figure 9:
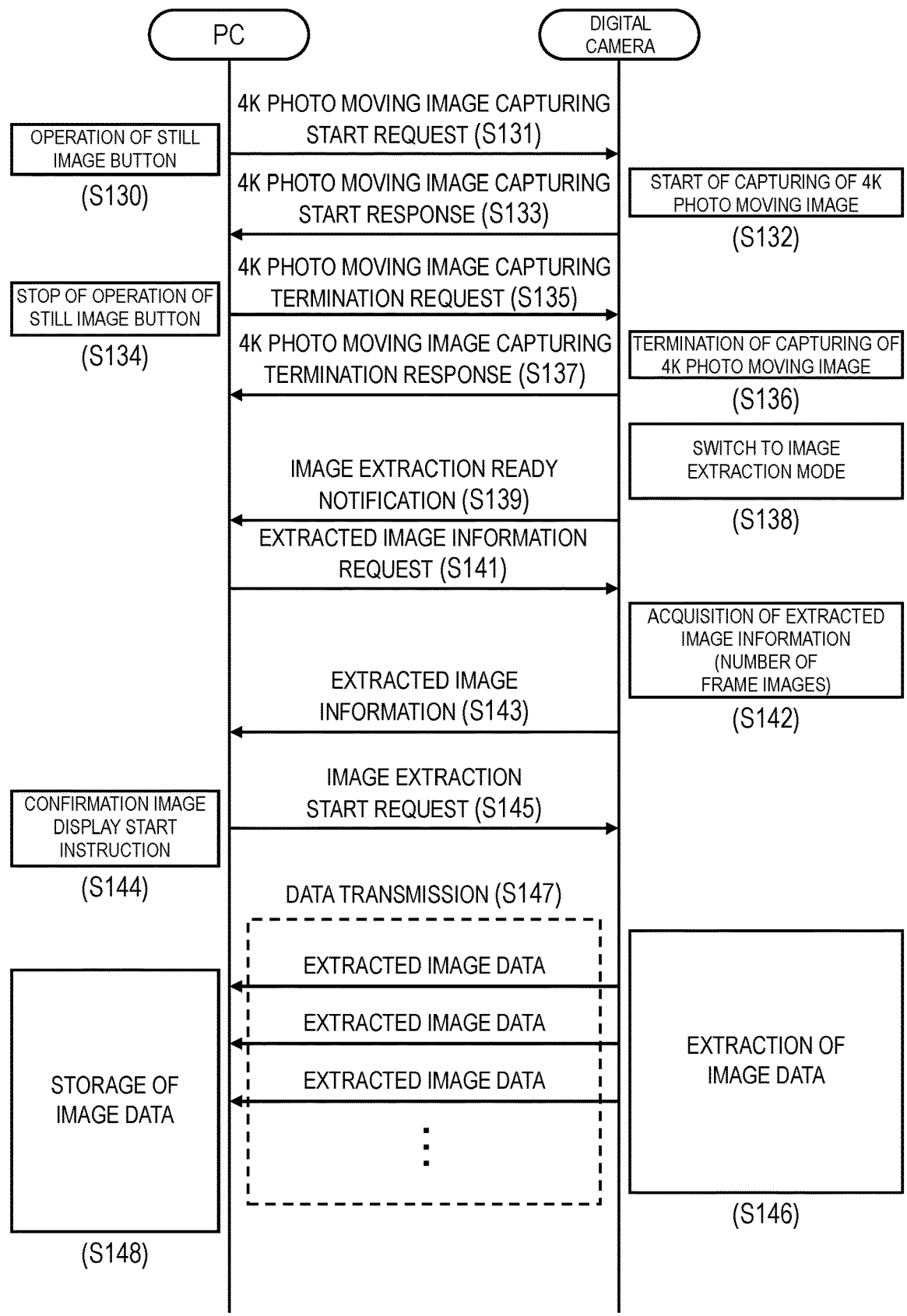
FIG. 9 illustrates a process in the imaging system when the digital camera captures a 4K photo moving image.

Next, with reference to FIG. 9, a description will be given below in detail of another example of the process of exchanging information between digital camera 100 and PC 500 in imaging system 10. In this example, digital camera 100 captures a moving image in the 4K photo mode and then transmits still image data to PC 500. FIG. 9 illustrates a process in which PC 500 remotely controls an image capturing operation of digital camera 100.

When the user keeps operating still image button 626 at step S130, at step S131, PC 500 transmits a 4K photo moving image capturing start request to digital camera 100 to give an instruction of starting to capture a moving image in the 4K photo mode. This 4K photo moving image capturing start request may be an example of a first request. In response to the 4K photo moving image capturing start request, digital camera 100 starts capturing a 4K photo moving image at step S132. After having started capturing the 4K photo moving image, at step S133, digital camera 100 notifies PC 500 that capturing of a 4K photo moving image has been started, as a response to 4K photo moving image capturing start request.

Digital camera 100 continues to capture the 4K photo moving image until the user stops operating still image button 626.

When the user stops operating still image button 626 at step S134, at step S135, PC 500 transmits a 4K photo moving image capturing termination request to digital camera 100 to give an instruction of terminating the capturing of the 4K photo moving image. In response to this 4K photo moving image termination request, at step S136, digital camera 100 terminates the capturing of the 4K photo moving image. At step S137, digital camera 100 notifies PC 500 that the capturing of the 4K photo moving image has been terminated, as a response to the 4K photo moving image capturing termination request. In this case, digital camera 100 stores data on the 4K photo moving image in memory card 160.

At step S138, digital camera 100 switches from the shooting mode to the image extraction mode. After having switched to the image extraction mode, at step S139, digital camera 100 transmits the image extraction ready notification which indicates that digital camera 100 is ready to extract still images to PC 500.

In this exemplary embodiment, digital camera 100 extracts all the frame images from the captured 4K photo moving image, then generates data on the extracted still images, and transmits the generated data to PC 500. Thereinafter, the process of transmitting the data on all the frame images as the still image data is referred to as the "bulk data transmission". To perform this bulk data transmission, digital camera 100 generates extracted still images that are as many as frame images making up the 4K photo moving image, and transmits data on the extracted still images.

When receiving the image extraction ready notification, at step S141, PC 500 transmits an extracted image information request which is a request for transmitting information on the extracted still images to digital camera 100. The extracted image information may contain a total number of frame images, for example.

At step S142, digital camera 100 acquires a number of still images extracted from the 4K photo moving image, namely, a number of frame images. At step S143, digital camera 100 transmits the extracted image information containing the number of frame images to PC 500.

Figure 10:
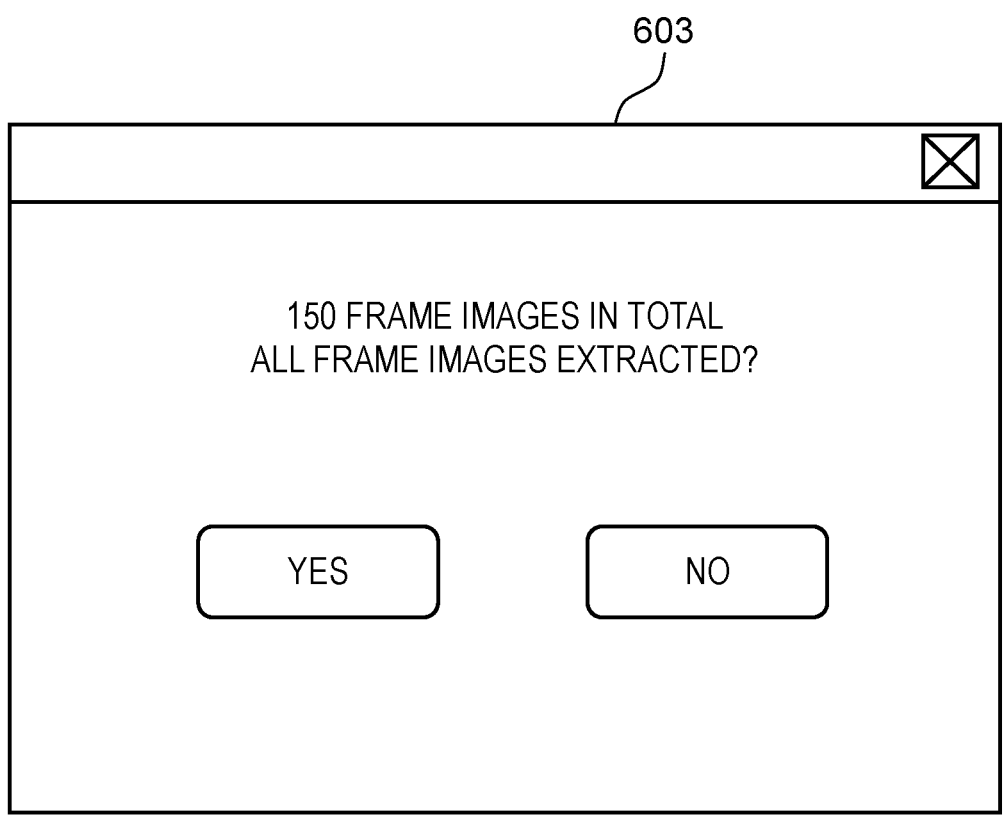
FIG. 10 illustrates an image on the display screen of the PC which is used to ask a user whether to transmit extracted images.

When receiving the extracted image information, PC 500 displays a confirmation image on operation screen 601 of display unit 513. FIG. 10 illustrates confirmation image 603 as an example of the confirmation image. Confirmation image 603 is used to ask the user whether to start the bulk data transmission.

When the user enters an instruction of starting an image extraction process in PC 500 (selects "YES" in confirmation image 603) at step S144, at step S145, PC 500 transmits an image extraction start request which is a request for starting extracting still images to digital camera 100. This image extraction start request may be an example of a second request. In response to the image extraction start request, digital camera 100 reads the data on the 4K photo moving image from memory card 160. Then, digital camera 100 sequentially extracts the frame images from the 4K photo moving image data at step S146, and then transmits the extracted still images data to PC 500 at step S147. At step S148, PC 500 receives the extracted image data from digital camera 100 and stores this extracted image data in data storage unit 517.

[2-5-3. Bulk Data Transmission]

Figure 11:
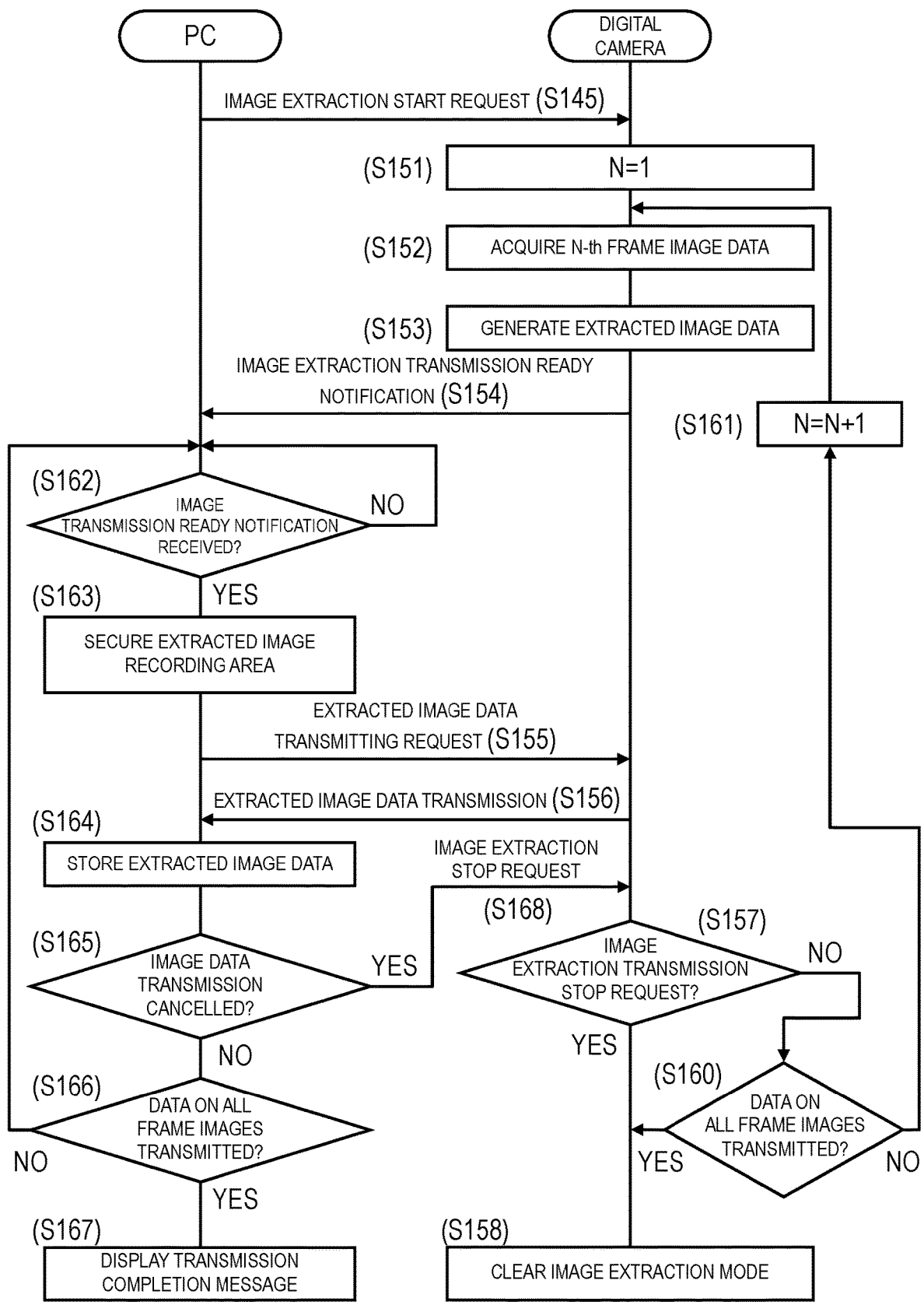
FIG. 11 illustrates a process in a first exemplary embodiment by which the extracted images are transmitted at one time.

Thereinafter, a description will be given of details of the process of the bulk data transmission which is performed at steps S146 and S147 in FIG. 9. FIG. 11 illustrates the bulk data transmission process in imaging system 10.

As illustrated in FIG. 11, when receiving the image extraction start request from PC 500 at step S145, digital camera 100, more specifically, controller 130 in digital camera 100 sets pointer N to 1 at step S151. In this case, pointer N may be a value indicating a frame number of frame image to be processed.

At step S152, digital camera 100 acquires an N-th frame image data from the 4K photo moving image. More specifically, controller 130 performs a process in which digital image and audio processor 120 reads the data on the 4K photo moving image from memory card 160 and extracts the N-th frame data from the data. At step S153, controller 130 performs a process in which digital image and audio processor 120 adds a joint photographic experts group (JPEG) header to the extracted frame data, thereby generating extracted still image data. Then, digital camera 100 stores the extracted still image data in RAM 150.

At step S154, digital camera 100 transmits an image transmission ready notification which indicates that digital camera 100 is ready to transmit the extracted still image data to PC 500. In this case, the image transmission ready notification contains a size of the still image data. When receiving the image transmission ready notification at step S162, PC 500 reserves a recording area within data storage unit 517 in which the extracted still image data is to be stored, based on the size of the still image data, at step S163.

At step S155, PC 500 transmits a request for transmitting the extracted still image data to digital camera 100.

When receiving the request for transmitting the extracted still image data from PC 500, at step S156, digital camera 100 reads the extracted still image data from RAM 150 and transmits the extracted still image data to PC 500. At step S164, PC 500 receives the extracted still image data and stores this extracted still image data in data storage unit 517.

Figure 12:
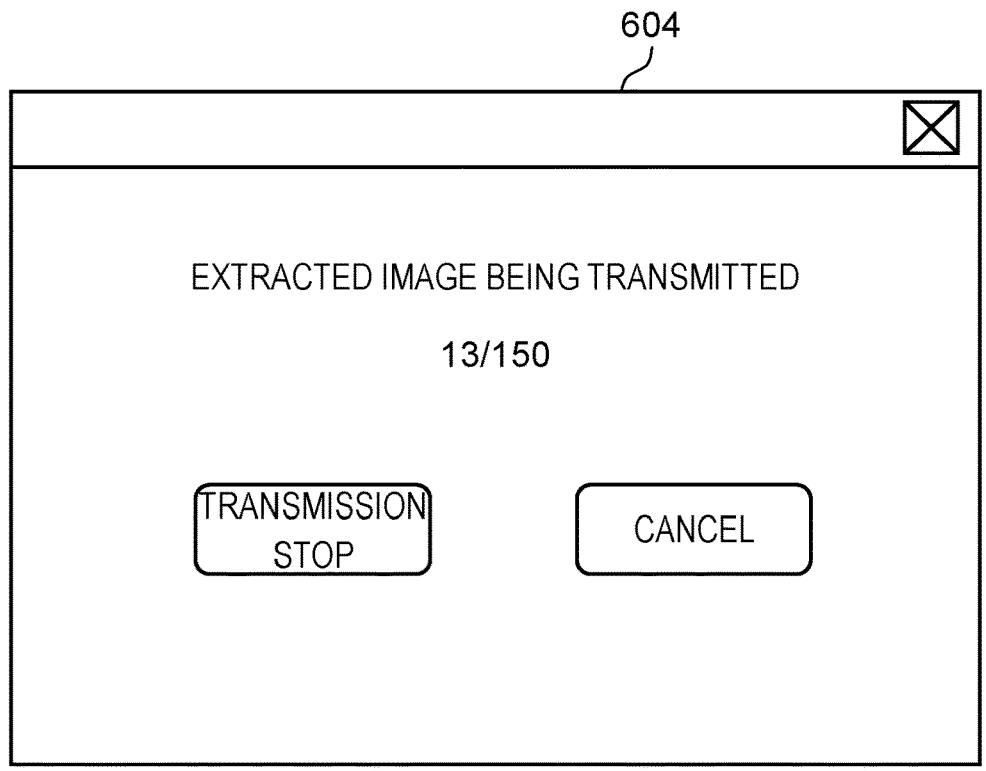
FIG. 12 illustrates an image on the display screen of the PC during the transmission of the extracted image data.

While receiving the extracted still image data, PC 500 displays a screen image 604, as illustrated in FIG. 12. When the user operates a cancel button in screen image 604, PC 500 stops the data transmission. More specifically, when the user operates the cancel button (YES at step S165), at step S168, PC 500 transmits a request to digital camera 100 for stopping extracting the still images. When receiving the request for stopping extracting the still images (YES at step S157), at step S158, digital camera 100 terminates the image extraction mode and switches to the shooting mode.

Figure 13:
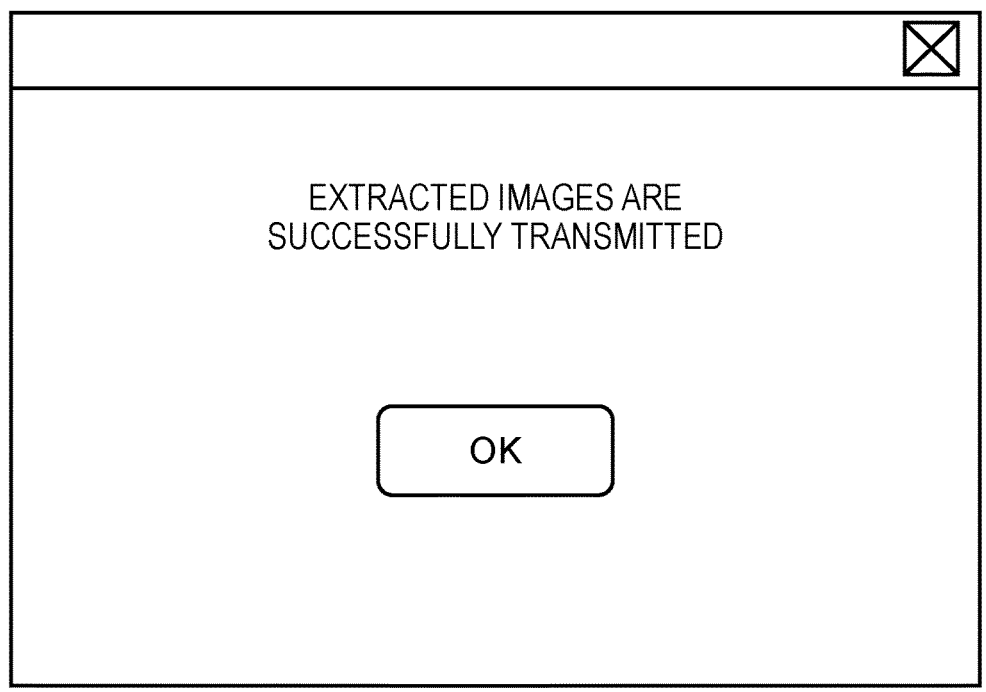
FIG. 13 illustrates an image on the display screen of the PC when the extracted image data is completely transmitted.

When not receiving the request for stopping extracting the still images from PC 500 (NO at step S157), digital camera 100 sets pointer N to (N+1) at step S161, and acquires data on an (N+1)-th frame image data at step S152. At steps S153 and S156, digital camera 100 generates the extracted still image data and transmits the extracted still image data to PC 500. After having completely transmitted the extracted still image data on all the frame images making up the 4K photo moving image at step S160 (YES at step S160), digital camera 100 terminates the image extraction mode at step S158. After having completely received the extracted still image data on all the frame images (YES at step S166), at step S167, PC 500 displays a message saying "extracted still images are successfully transmitted", as illustrated in FIG. 13.

In imaging system 10 in this exemplary embodiment, as described above, when capturing an image in the 4K photo mode, digital camera 100 generates a plurality of still images and then transmits data on the still images to PC 500 at one time. In this way, imaging system 10 can transmit the image data captured in the 4K photo mode with improved convenience to a user.

[3. Effect and Other Related Features]

Digital camera 100 or camera body 102 in this exemplary embodiment serves as an imaging apparatus that is remotely controllable by PC 500. Digital camera 100 or camera body 102 may be an example of the imaging apparatus; PC 500 may be an example of the electronic device disposed outside the imaging apparatus. Digital camera 100 or camera body 102 includes: communication unit 195 that communicates with PC 500; CCD 143 that captures an image of a subject to generate a 4K photo moving image data from which still image data is to be extracted; card slot 165 that stores the 4K photo moving image data generated by CCD 143 in memory card 160; and controller 130 that controls an operation of digital camera 100 or camera body 102. The 4K photo moving image data may be an example of the moving image data; CCD 143 may be an example of an imaging unit; card slot 165 may be an example of the storage unit; memory card 160 may be an example of a predetermined recording medium; and controller 130 may be an example of a control unit.

Controller 130 receives the 4K photo moving image capturing start request from PC 500 and, in response to this 4K photo moving image capturing start request, performs a process of generating the 4K photo moving image data. The 4K photo moving image capturing start request may be an example of the first request. For example, controller 130 causes CCD 143 and digital image and audio processor 120 to generate the 4K photo moving image data. Controller 130 receives the image extraction start request from PC 500 and, in response to this image extraction start request, performs a process of extracting at least one frame image from the 4K photo moving image data stored in memory card 160 to generate the still image data. The image extraction start request may be an example of the second request. As an example, controller 130 causes digital image and audio processor 120 to extract the at least one frame image from the stored 4K photo moving image data to generate the still image data. As an alternative example, controller 130 solely extracts the at least one frame image from the stored 4K photo moving image data to generate the still image data. Controller 130 causes communication unit 195 to transmit the generated still image data to PC 500.

PC 500 serves as an electronic device that remotely controls digital camera 100 or camera body 102 that can generate the 4K photo moving image. PC 500 may be an example of the electronic device disposed outside the imaging apparatus; the 4K photo moving image may be an example of the moving image data from which the still image data is to be extracted. PC 500 includes: communication unit 518 that communicates with digital camera 100 or camera body 102; data storage unit 517 that retains the still image data generated from the 4K photo moving image data in digital camera 100 or camera body 102; operation unit 515 through which a user enters an instruction for remote control; and controller 511 that controls an operation of PC 500. Data storage unit 517 may be an example of the recording medium; and controller 511 may be an example of a control unit.

In response to an instruction of staring to capture an image which has been received through operation unit 515, controller 511 causes communication unit 518 to transmit the 4K photo moving image capturing start request which is an instruction of generating the 4K photo moving image data to digital camera 100 or camera body 102 (at step S131). The 4K photo moving image capturing start request may be an example of the first request. When controller 511 receives a notification which indicates that the 4K photo moving image data has been completely generated from digital camera 100 or camera body 102 (at steps S137 and S139), controller 511 causes communication unit 518 to transmit the image extraction start request to digital camera 100 or camera body 102 (at step S145). The image extraction start request may be an example of the second request. The image extraction start request is an instruction of extracting the at least one frame image from the 4K photo moving image data to generate the still image data. Controller 511 receives the still image data from digital camera 100 or camera body 102 and stores the received still image data in data storage unit 517 (at step S148).

A method of transmitting image data in this exemplary embodiment is a method in which digital camera 100 or camera body 102 transmits the image data under remote control of PC 500. Digital camera 100 or camera body 102 may be an example of the imaging apparatus; and PC 500 may be an example of the electronic device.

Digital camera 100 or camera body 102 receives the 4K photo moving image capturing start request from PC 500 and, in response to this 4K photo moving image capturing start request, captures the 4K photo moving image to generate the moving image data. The 4K photo moving image capturing start request may be the first request; and the 4K photo moving image may be an example of the moving image.

Digital camera 100 or camera body 102 receives the image extraction start request from PC 500 and, in response to this image extraction start request, extracts at least one frame image from the generated moving image data to generate the still image data. The image extraction start request may be an example of the second request.

Digital camera 100 or camera body 102 transmits the generated still image data to PC 500.

In the above way, digital camera 100 or camera body 102, when capturing a 4K photo moving image, automatically generates still image data from the 4K photo moving image data and transmits the still image data to PC 500. Thus, this configuration obviates the necessity for a user to operate digital camera 100 or camera body 102, thereby improving convenience to a user.

Second Exemplary Embodiment

According to the configuration of imaging system 10 in the foregoing first exemplary embodiment, digital camera 100 performs the bulk data transmission. More specifically, digital cameras 100 captures the 4K photo moving image, then extracts all the frame images making up the 4K photo moving image, and transmits data on the extracted frame images to PC 500 at one time. However, the configuration of the present disclosure is not limited to this configuration. Alternatively, the digital camera 100 may extract only some of the frame images making up the 4K photo moving image and transmit data on the extracted frame images to PC 500.

According to imaging system 10 in a second exemplary embodiment that will be described below, digital camera 100 extracts only some images specified by a user and transmits data on the extracted frame images to PC 500. More specifically, the user specifies and enters a frame number of a first one of the frame images to be extracted, or a first frame number, in imaging system 10. Following this, the user specifies and enters a number of frame images to be extracted, including the above first frame image, in imaging system 10. Through those procedures, digital camera 100 extracts only the frame images specified by the user, generates data on the extracted frame images, and transmits the generated data.

The configuration and behavior of imaging system 10 in the second exemplary embodiment are similar to the configuration and behavior of imaging system 10 in the first exemplary embodiment. Thus, the following description will be mainly focused on differences in imaging system 10 between the first and second exemplary embodiments.

Figure 14:
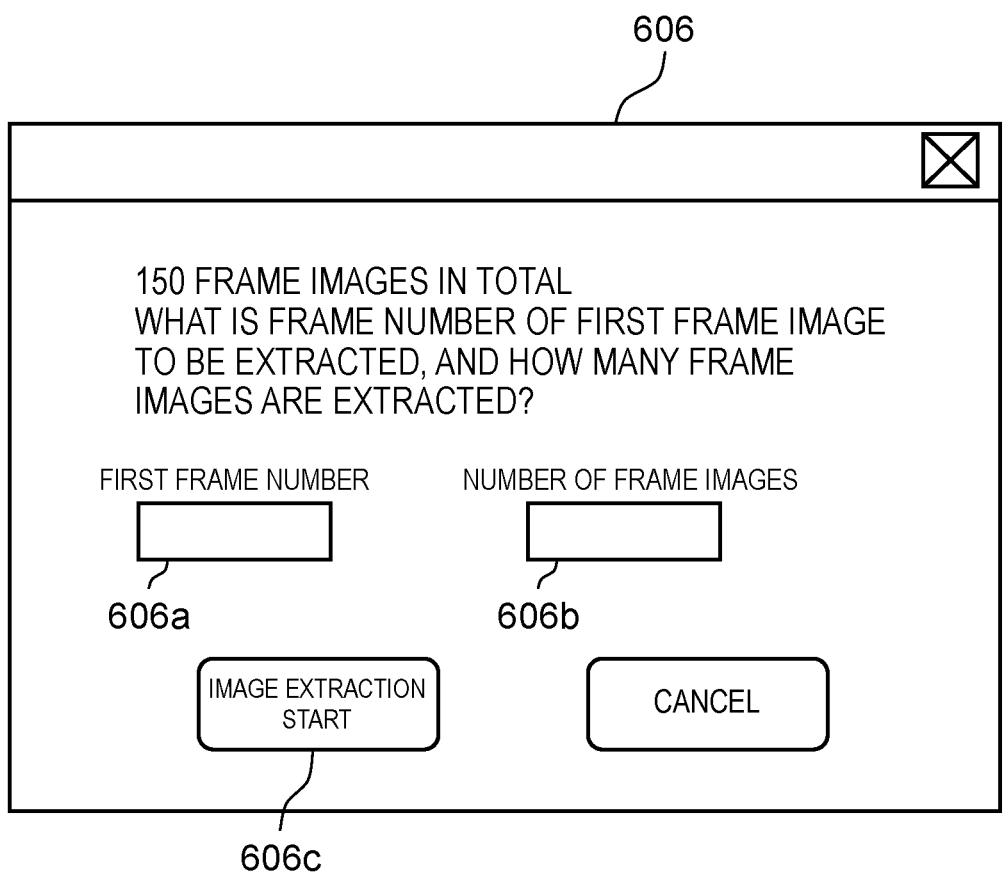
FIG. 14 illustrates an image on a display screen of a PC in a second exemplary embodiment which is used to specify a frame number of a first frame image and a number of frame images to be extracted and transmitted.

In the process of the first exemplary embodiment illustrated in FIG. 9, when receiving the extracted image information at step S143, PC 500 displays confirmation image 603, as illustrated in FIG. 10, in display unit 513 to ask the user whether to start the bulk data transmission at step S144. In contrast, in the process of the second exemplary embodiment, when receiving the extracted image information at step S143, PC 500 displays entry screen 606, as illustrated in FIG. 14, instead of confirmation image 603 as illustrated in FIG. 10. Entry screen 606 contains regions 606*a* and 606*b*; region 606*a* is used by the user to specify the first frame image, and region 606*b* is used to specify a number of frame images to be extracted and transmitted. The first frame image and the number of frame images may be information that specifies a range of frame images to be extracted and transported. When the user specifies and enters both the first frame image and the number of frame images through entry screen 606 as illustrated in FIG. 14, PC 500 transmits an image extraction start request to digital camera

100, at step S145. When receiving the image extraction start request, digital camera 100 extracts frame images from the 4K photo moving image in accordance with the range specified by the user, and then generates still image data from the extracted frame images. After that, digital camera 100 transmits the generated still image data to PC 500.

Figure 15:
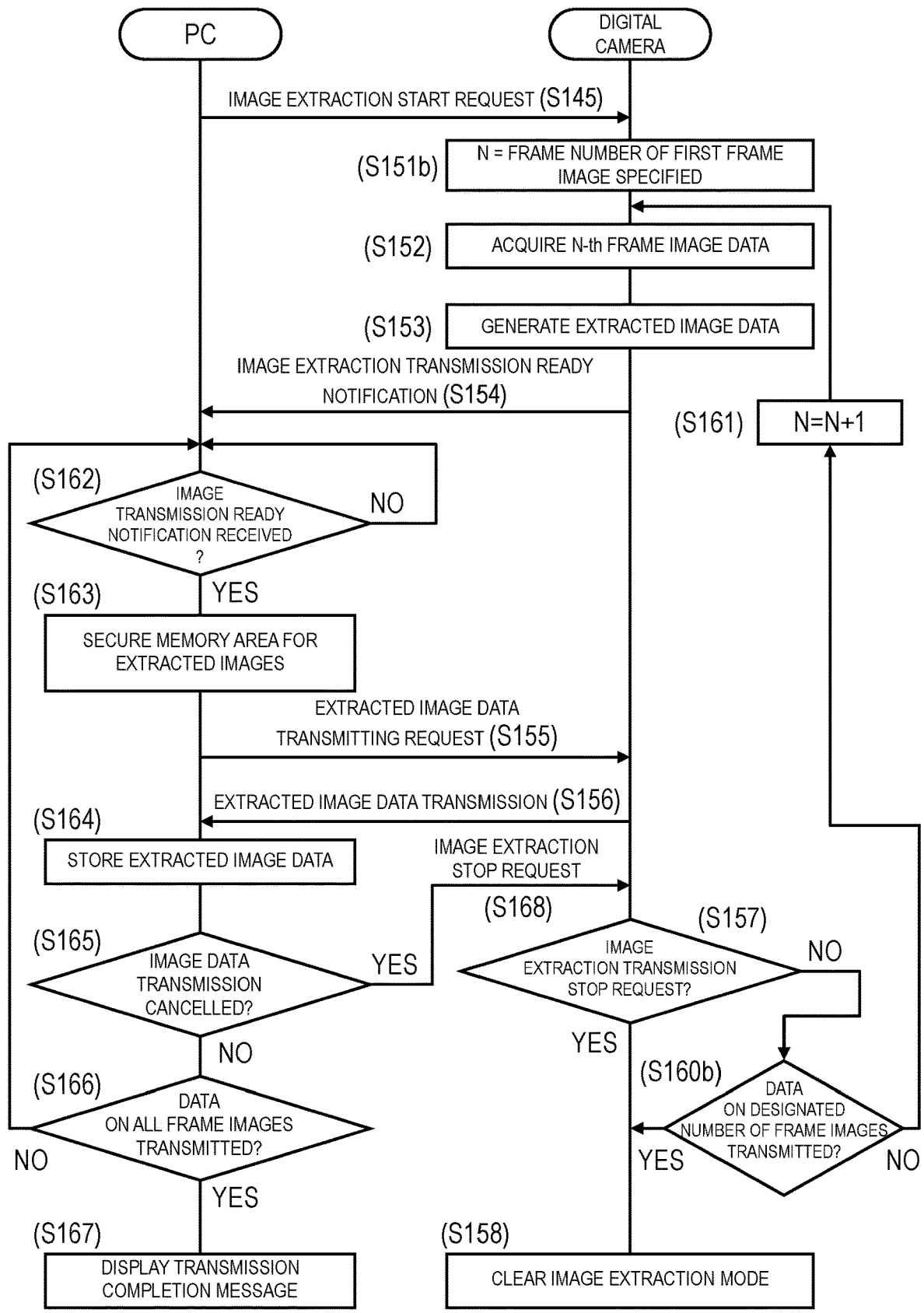
FIG. 15 is a flowchart of a process of transmitting data on the extracted images (specifying the frame number of the first frame image and the number of frame images to be extracted and transmitted) in the second exemplary embodiment.

FIG. 15 is a detailed flowchart of a process in this exemplary embodiment which imaging system 10 performs after PC 500 has transmitted the image extraction start request. The process of FIG. 15 is related to the process of FIG. 11 in the first exemplary embodiment.

When imaging system 10 starts performing the process of FIG. 15, PC 500 displays entry screen 606 of FIG. 14 in display unit 513. The user specifies both the first frame image and the number of frame images through regions 606a and 606b in entry screen 606 and then operates an image extraction start button 606c. In response, at step S145, PC 500 transmits the image extraction start request to digital camera 100.

In this case, the image extraction start request contains information on an image extraction type, the specified first frame number, and the number of frame images specified. In this exemplary embodiment, the user selects a "partial image extraction" as the image extraction type.

When receiving the image extraction start request, digital camera 100 recognizes that a process of the partial image extraction will be performed, and sets pointer N to the first frame number specified through entry screen 606 at step S151b. At step S152, digital camera 100 extracts an N-th frame image from the 4K photo moving image. At step S153, digital camera 100 generates data on the extracted frame image. At step S156, digital camera 100 transmits the generated data to PC 500. Following the above, until pointer N reaches the number of frame images specified through entry screen 606 at step S160b, digital camera 100 repeatedly increments the pointer N at step S161, extracts an N-th frame image from the 4K photo moving image at step S152, generates data on the extracted frame image at step S153, and transmits the generated data to PC 500 at step S156.

The remaining part of this process of FIG. 15 will not be described, because this remaining part is identical to the corresponding part of the process of FIG. 11 in the foregoing first exemplary embodiment.

Through the above process performed in imaging system 10, the user specifies an initial location and a range of frame images to be extracted, and digital camera 100 extracts frame images in accordance with the specified initial location and range. Then, digital camera 100 generates data on the extracted frame images and transmits the generated data to PC 500. In this way, in imaging system 10, digital camera 100 transmits, to PC 500, only frame image data that the user needs. This configuration can suppress PC 500 from wasting a storage capacity of data storage unit 517.

Third Exemplary Embodiment

In a third exemplary embodiment that will be described below, digital camera 100 also extracts only frame images specified by a user and transmits data on the extracted frame images. However, imaging system 10 has another configuration. The following description will be mainly focused on differences in imaging system 10 between the second and third exemplary embodiments.

Figure 16:
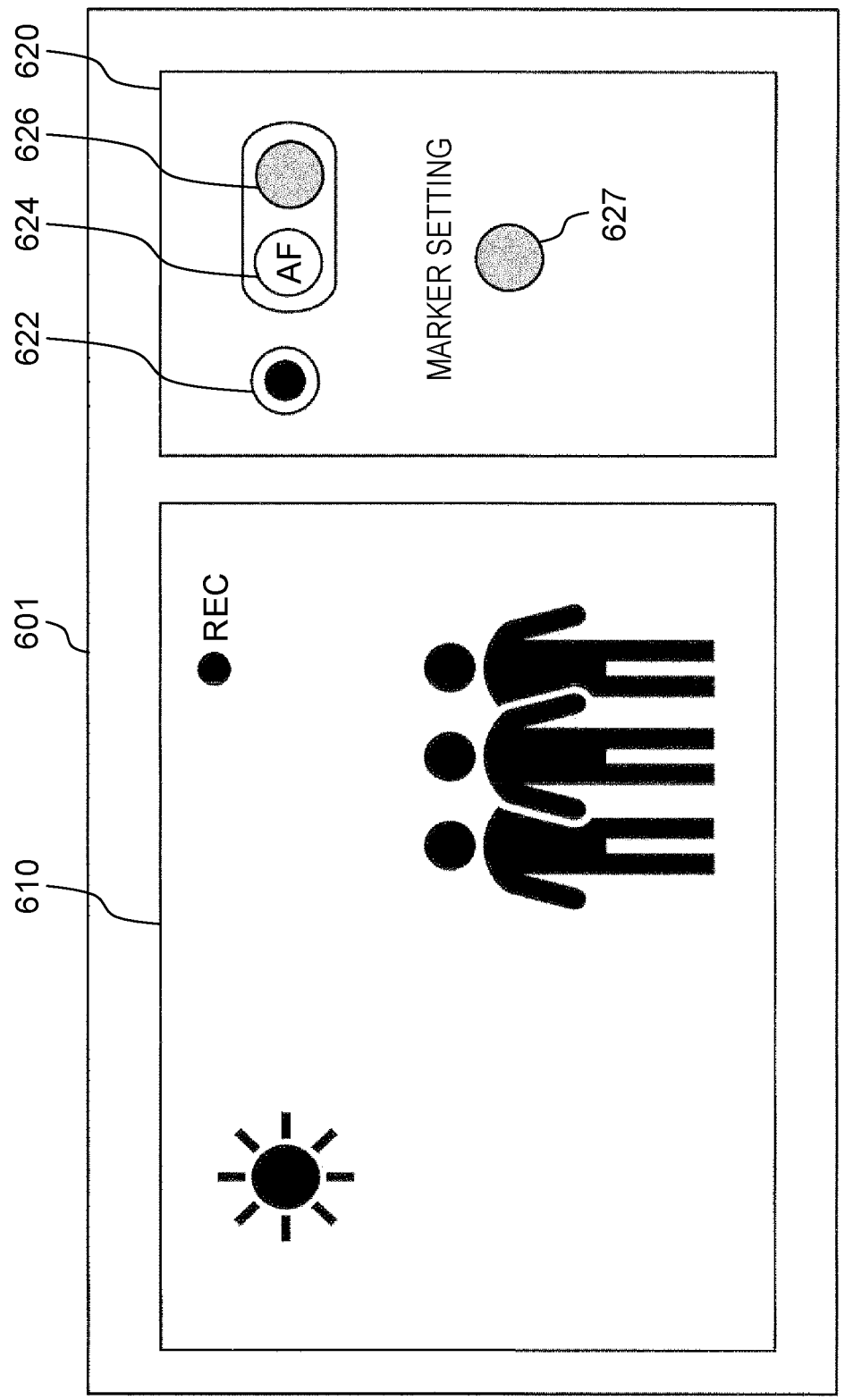
FIG. 16 illustrates a marker setting button displayed in a display unit of a PC, in a third exemplary embodiment.

In this exemplary embodiment, PC 500 allows a user to remotely mark a 4K photo moving image while digital camera 100 is capturing the 4K photo moving image. In this case, the user may mark the 4K photo moving image at any desired timing. For example, PC 500 may display an image, as illustrated in FIG. 16, on operation screen 601 of display unit 513 while digital camera 100 is capturing the 4K photo moving image. In addition, PC 500 may display marker setting button 627 on operation screen 601 which is used by the user to mark the 4K photo moving image.

Figures 17, 18:
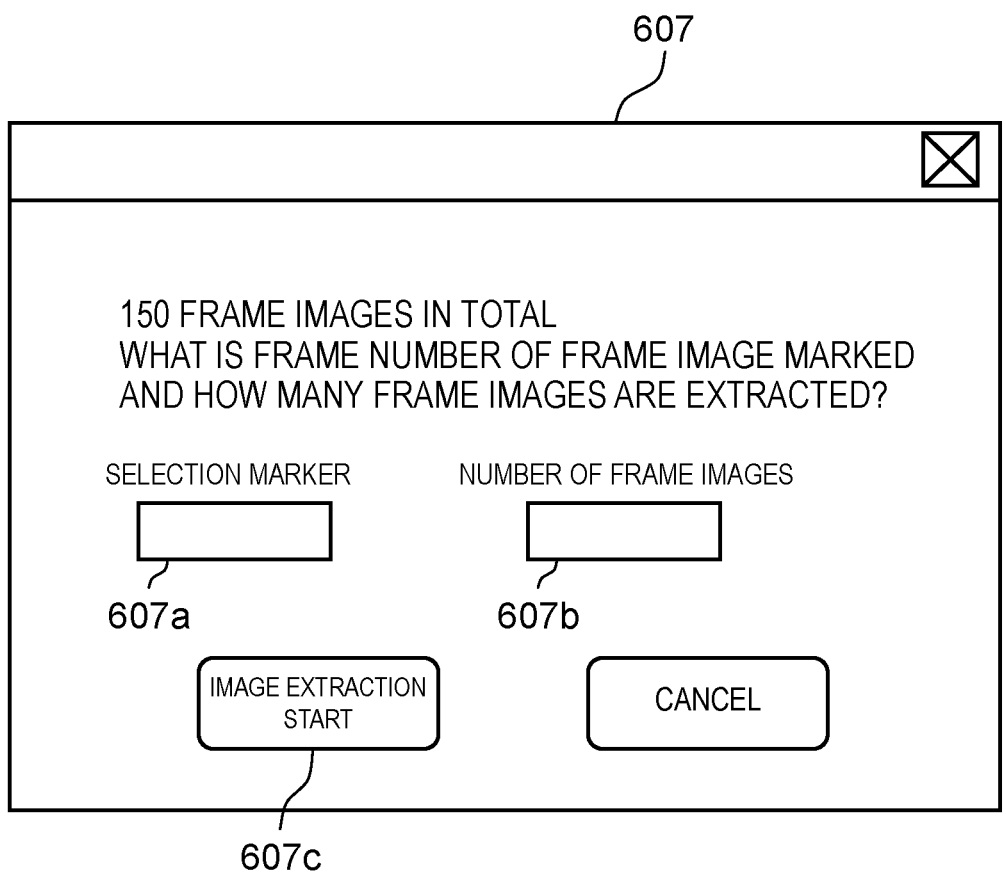
FIG. 17 illustrates marker information in the third exemplary embodiment.
FIG. 18 illustrates an image on a display screen of the PC in the third exemplary embodiment which is used to specify an initial location and a number of extracted images to be transmitted.

When the user operates marker setting button 627 during the capturing of the 4K photo moving image, PC 500 transmits a marker setting request to digital camera 100. When receiving this marker setting request, digital camera 100 adds a marker to the 4K photo moving image being captured. More specifically, digital camera 100 updates marker information as illustrated in FIG. 17. As illustrated in FIG. 17, the marker information contains marker numbers and frame numbers of frame images marked, which are related to each other. When receiving the marker setting request, controller 130 in digital camera 100 accesses the marker information and relates a marker to the frame number of a frame image being captured at the time of receiving the marker setting request. Digital camera 100 may add a plurality of markers to respective frame images in the 4K photo moving image.

In the third exemplary embodiment, PC 500 uses a marker number to specify the first frame image to be extracted, although in the foregoing second exemplary embodiment, PC 500 uses a frame number to specify the first frame image.

In the process, as illustrated in FIG. 9, of this exemplary embodiment, at step S143, PC 500 receives a total number of frame images, a number of markers, and other marker-related information, as information on frame images to be extracted. Thus, PC 500 displays entry screen 607 as illustrated in FIG. 18, instead of entry screen 606, as illustrated in FIG. 14, in the foregoing second exemplary embodiment. Entry screen 607 of FIG. 18 contains region 607a denoted as a "selection marker". Through region 607a, the user specifies a marker number as information on the first frame image to be extracted.

Figure 19:
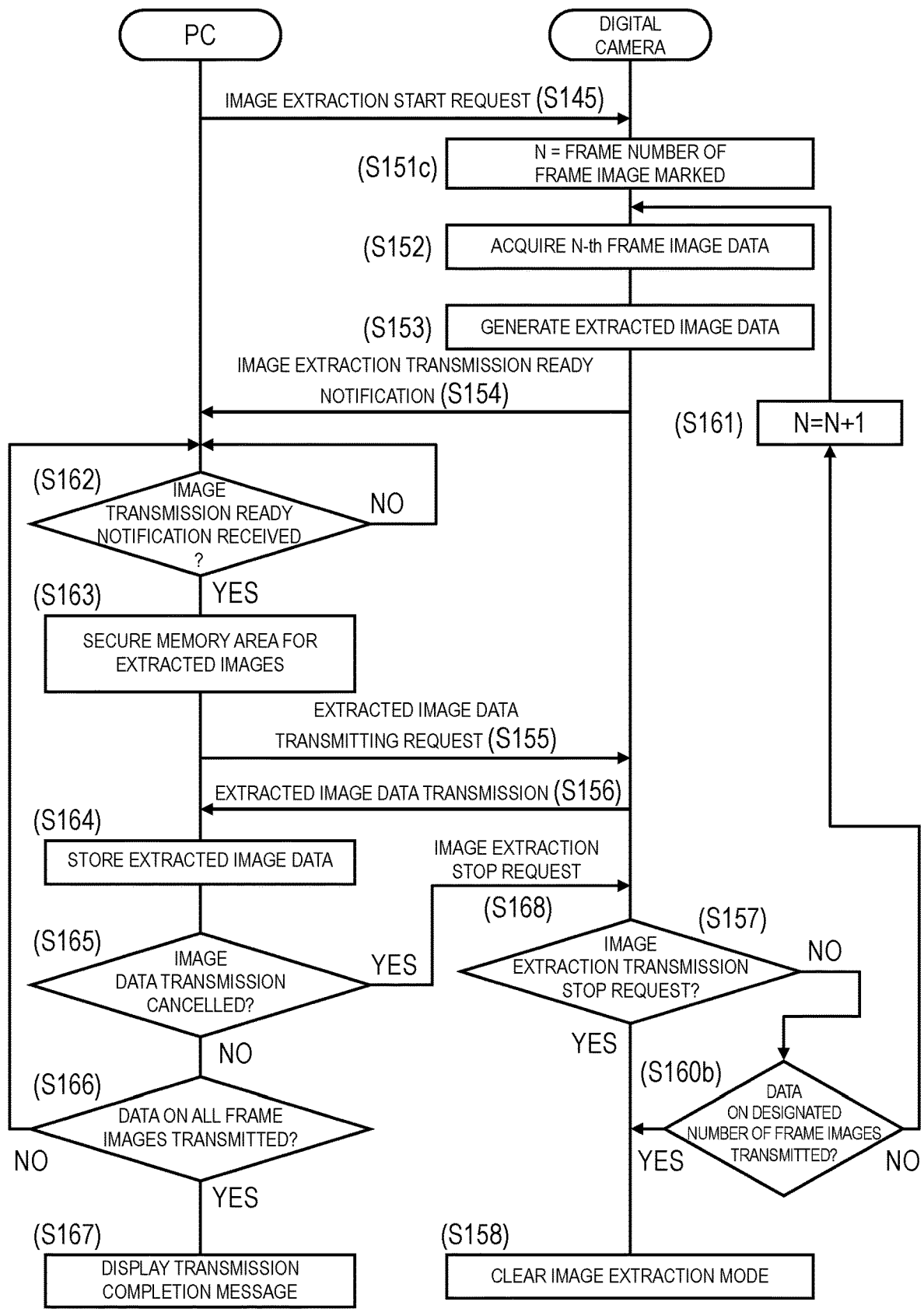
FIG. 19 is a flowchart of a process of transmitting data on the extracted images (specifying a frame number of a first frame image and a number of frame images to be extracted and transmitted) in the third exemplary embodiment.

FIG. 19 is a detailed flowchart of a process in this exemplary embodiment which imaging system 10 performs after PC 500 has transmitted an image extraction start request. The process of FIG. 19 is related to the process of FIG. 15 in the foregoing second exemplary embodiment.

When imaging system 10 starts performing the process of FIG. 19, PC 500 displays entry screen 607 of FIG. 18 in display unit 513. The user specifies both the marker number and the number of frame images to be transmitted through regions 607a and 607b in entry screen 607 and then operates image extraction start button 607c. In response, at step S145, PC 500 transmits the image extraction start request to digital camera 100. In this case, the image extraction start request contains information on an image extraction type, the specified marker number, and the number of frames to be transmitted. In this exemplary embodiment, the user selects "marker extraction" as the image extraction type.

When receiving the image extraction start request, digital camera 100 recognizes that a process of the marker extraction will be performed, and sets pointer N to a frame number corresponding to the specified marker number, at step S151c. Controller 511 in digital camera 100 refers to the marker information, thereby identifying the frame number corresponding to the specified marker number.

At step S152, digital camera 100 extracts an N-th frame image from the 4K photo moving image. At step S153, digital camera 100 generates data on the extracted frame image. At step S156, digital camera 100 transmits the generated data to PC 500. Then, until pointer N reaches the number of frame images specified through entry screen 607 at step S160*b*, digital camera 100 repeatedly increments pointer N at step S161, extracts an N-th frame image from the 4K photo moving image at step S152, generates data on the extracted frame image at step S153, and transmits the generated data to PC 500 at step S156.

The remaining part of the process of FIG. 19 will not be described, because this remaining part is identical to the corresponding part of the process in the foregoing second exemplary embodiment.

According to the above example configuration, digital camera 100 sets an initial location of frame images to be extracted to a location of a frame image corresponding to a marker number specified by the user. Then, digital camera 100 sequentially extracts the specified number of frame images from the initial location. However, the method of specifying frame images to be extracted using a marker number is not limited to the above method. As an alternative example, PC 500 may receive a plurality of marker numbers specified by the user. In this case, PC 500 may transmit the image extraction start request containing the specified marker numbers to digital camera 100. Then, digital camera 100 may extract frame images corresponding to the marker numbers contained in the received image extraction start request, and transmit the extracted frame images to PC 500. Imaging system 10 thereby can extract a plurality of frame images specified as appropriate by the user.

According to imaging system 10 in this exemplary embodiment, as described above, digital camera 100 can set an initial location of frame images to be extracted to a location of a frame image marked in advance by the user. This configuration can save the user the trouble of searching for an initial location of frame images to be extracted. Thus, imaging system 10 can improve convenience to a user.

Fourth Exemplary Embodiment

In the foregoing second and third exemplary embodiments, imaging system 10 permits the user to specify a range of image frames to be extracted from the 4K photo moving image by using the initial location and the number of frame images. However, the method of specifying image frames to be extracted from the 4K photo moving image is not limited to the method using a first frame image and the number of frame images. A description will be given below of a configuration in a fourth exemplary embodiment in which image frames to be extracted from the 4K photo moving image are specified using thumbnail images.

Figure 20:
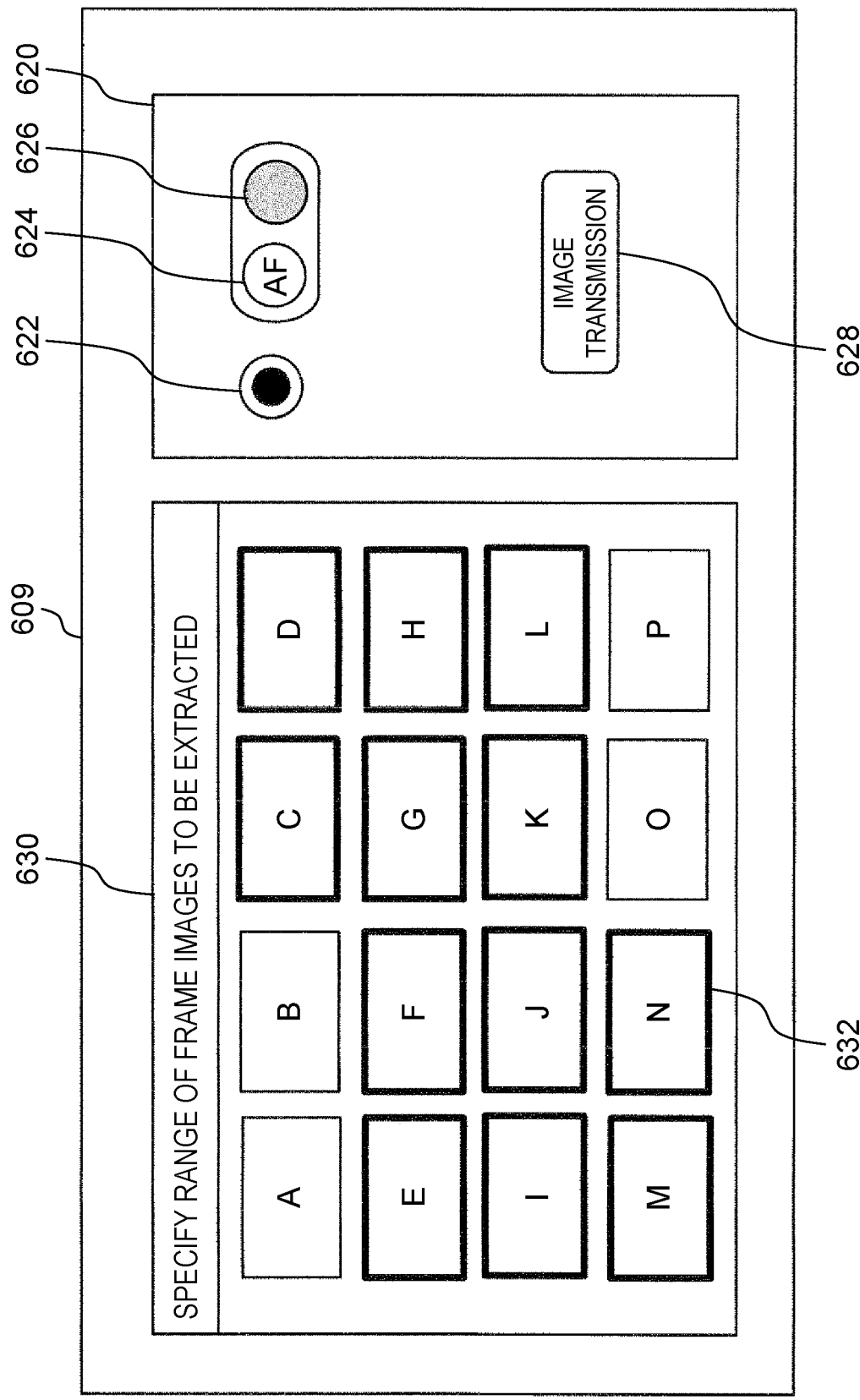
FIG. 20 illustrates an image on the display screen of the PC in which thumbnail images for use in specifying an extracted range are arranged.

FIG. 20 illustrates an entry screen displayed on operation screen 609 of PC 500 in which thumbnail images are arranged; this entry screen is used to specify a range of frame images to be extracted. Operation screen 609 displays frame image range specifying window 630 in which a plurality of thumbnail images 632 are arranged. Thumbnail images 632 are related to respective frame images that make up the 4K photo moving image captured by digital camera 100. To specify a range of frame images to be extracted, a user can select thumbnail images corresponding to the frame images at the initial and final locations through operation screen 609. In the example of FIG. 20, the user specifies the range of frame images to be extracted by selecting frame images "C" to "N".

Figure 21:
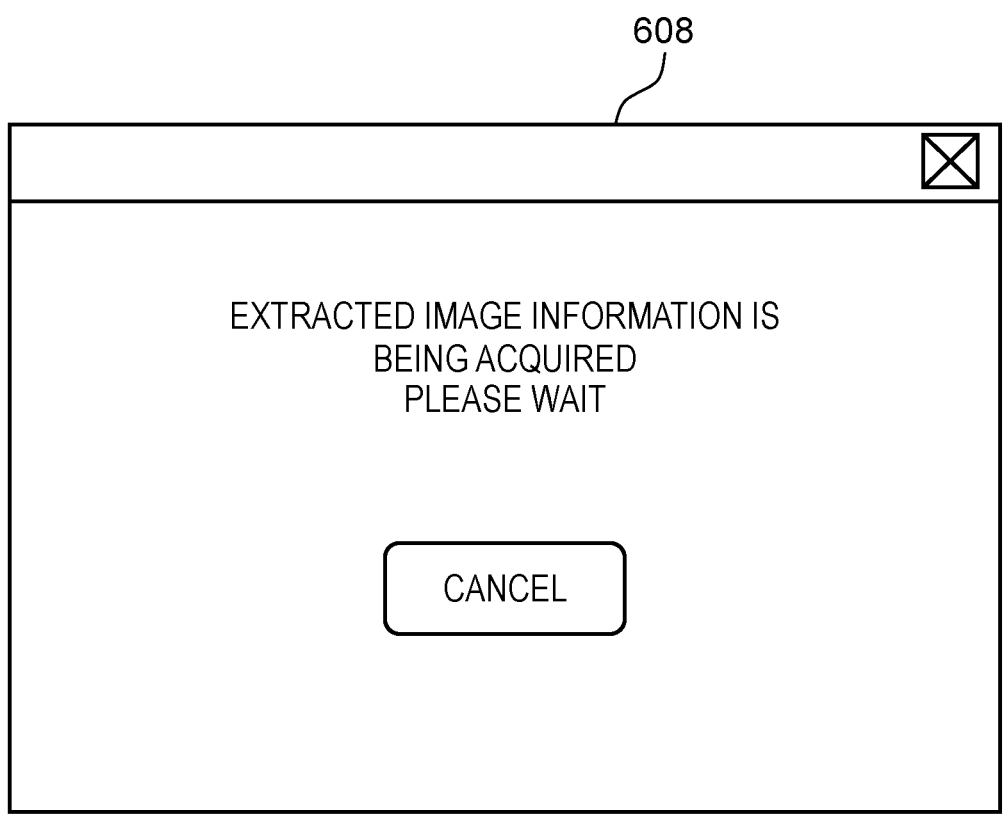
FIG. 21 illustrates an image on the display screen of the PC during acquisition of information on the extracted images.

In the fourth exemplary embodiment, PC 500 displays message image 608 as illustrated in FIG. 21, instead of entry screen 606 as illustrated in FIG. 14 in the foregoing second exemplary embodiment. Message image 608 notifies the user that PC 500 is acquiring extracted image information from digital camera 100. After having acquired the extracted image information, PC 500 transmits an image extraction start request to digital camera 100 at step S145.

Figure 22:
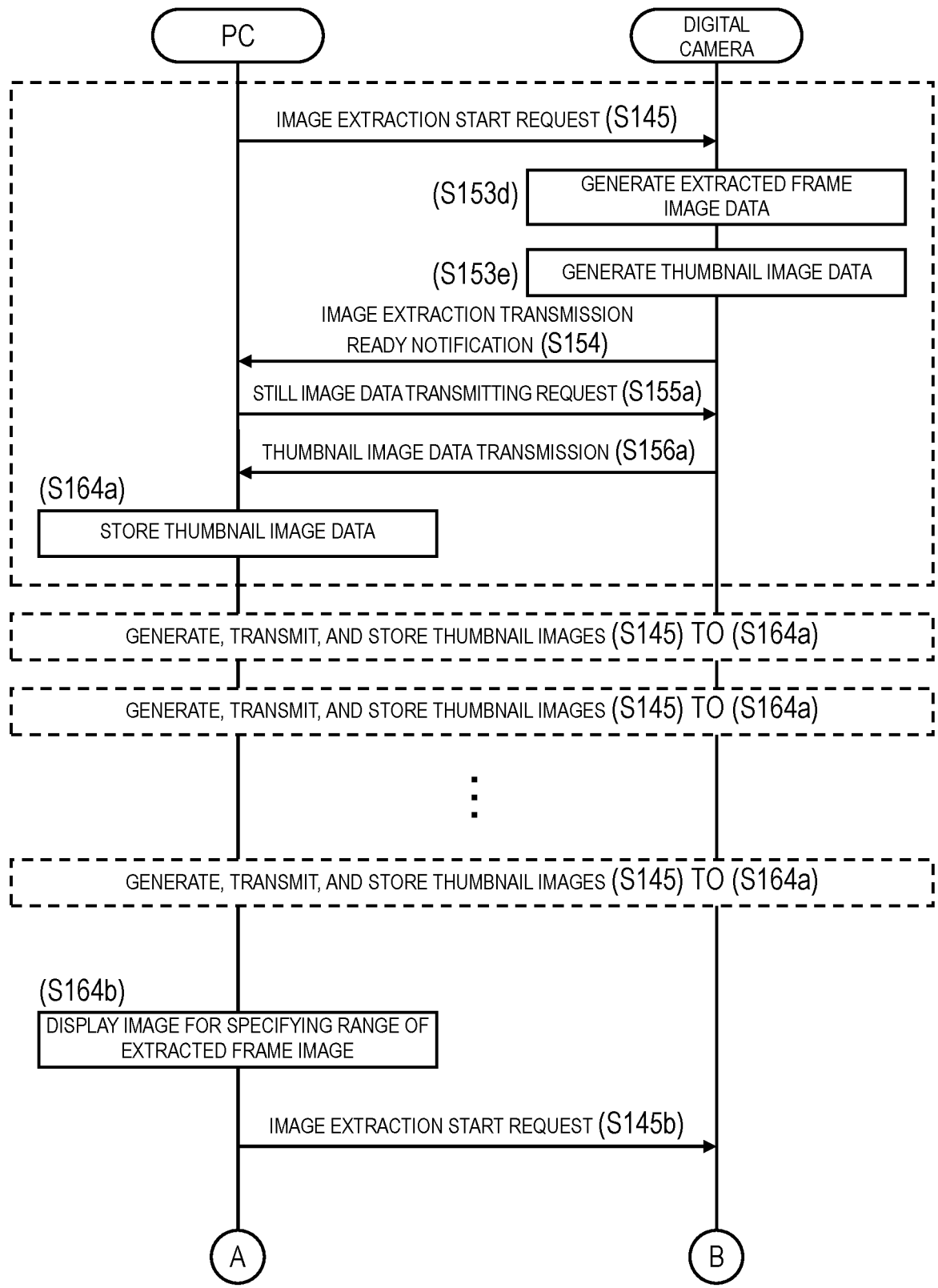
FIG. 22 is a flowchart of a first process of transmitting data on extracted images in accordance with specification using thumbnail images, in a fourth exemplary embodiment.
Figure 23:
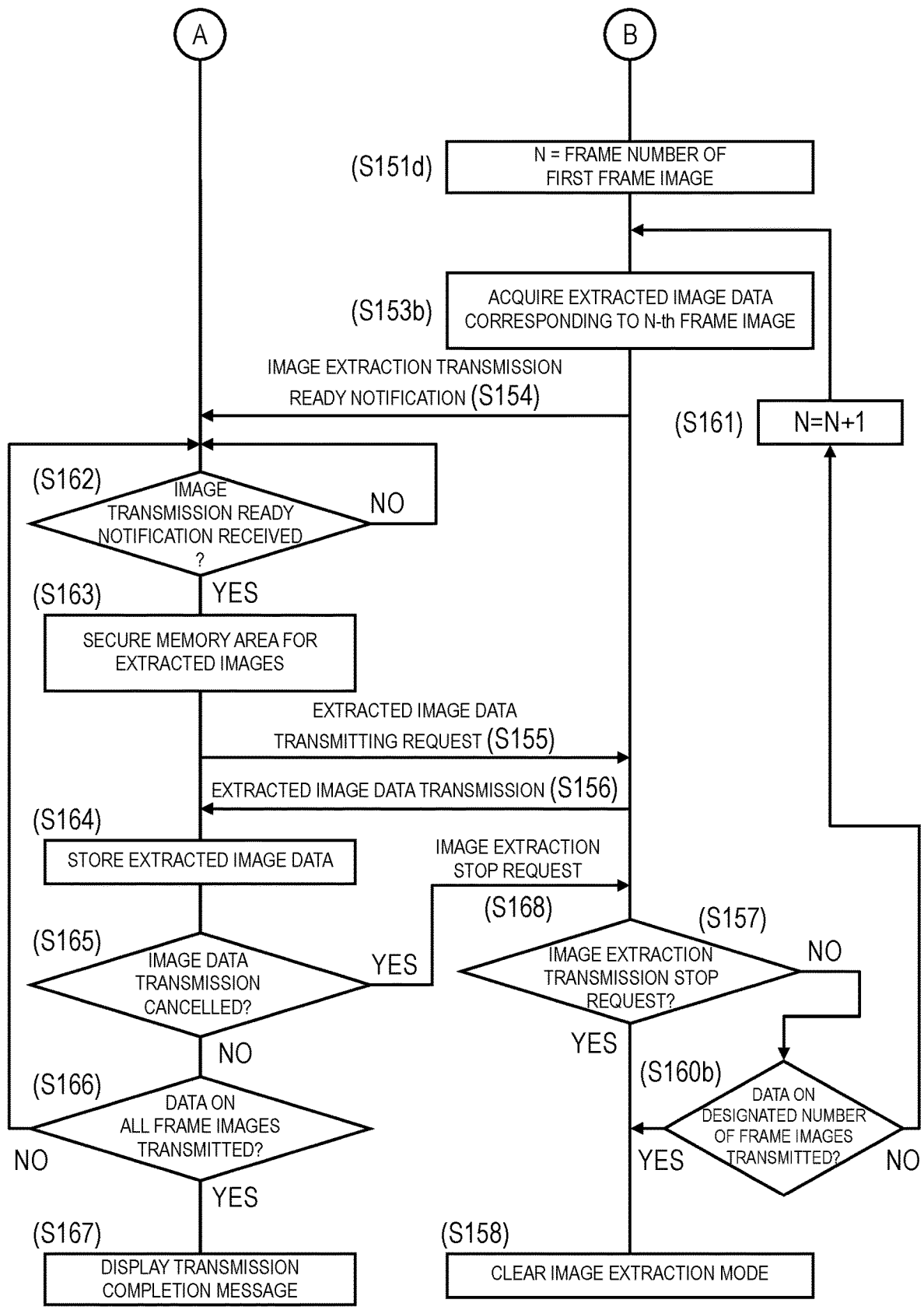
FIG. 23 is a flowchart of a second process of transmitting the data on the extracted images in accordance with the specification using the thumbnail images, in the fourth exemplary embodiment.

FIGS. 22 and 23 are detailed sequence diagrams illustrating a process in this exemplary embodiment which imaging system 10 performs after PC 500 has transmitted the image extraction start request. The process of FIGS. 22 and 23 is related to the process of FIG. 11 in the first exemplary embodiment.

The image extraction start request transmitted from PC 500 contains information on an image extraction type. In this exemplary embodiment, the user selects "acquisition using thumbnail image" as the image extraction type. When receiving the image extraction start request at step S145, digital camera 100 recognizes that a process of acquisition using thumbnail images will be performed. At step S153*d*, digital camera 100 extracts the frame images from the 4K photo moving image data and generates data on the extracted frame images. At step S153*e*, digital camera 100 resizes the extracted images to generate thumbnail images. Digital camera 100 stores data on the extracted frame images and the generated thumbnail images in a working area of RAM 150.

After having completely generated the data on the thumbnail images, digital camera 100 transmits an image transmission ready notification to PC 500 at step S154. When receiving this image transmission ready notification, PC 500 transmits a still image data transmitting request to digital camera 100 at step S155*a*; the still image data transmitting request may be an example of a third request. In response to this still image data transmitting request, digital camera 100 transmits the thumbnail image data on all the frame images to PC 500 at step S156*a*.

When receiving the thumbnail image data from digital camera 100, PC 500 stores the received thumbnail image data in data storage unit 517 at step S164*a*.

PC 500 and digital camera 100 perform the above processes at steps S145, S153*d*, S153*e*, S154, S155*a*, S156*a*, and S164*a* for each individual frame image. In short, digital camera 100 generates the thumbnail image for each individual frame image, and transmits data on the generated thumbnail image to PC 500. Then, PC 500 receives and stores the data. After having completely stored the thumbnail image data on all the frame images, PC 500 displays frame image range specifying window 630, as illustrated in FIG. 20, on operation screen 609 of display unit 513 in order to allow the user to specify a range of frame images to be extracted, at step S164*b*. In this case, PC 500 displays thumbnail images arranged on operation screen 609.

The user specifies the range of frame images to be extracted by selecting thumbnail images on operation screen 609 and then operates image transmission button 628. In response, PC 500 displays confirmation image 606 as illustrated in FIG. 14. In this case, PC 500 determines a first frame image number and a number of frame images, based on the information specified by the user through operation screen 609 as illustrated in FIG. 20 and then enters the first frame image number and the number of frame images in regions 606*a* and 606*b*, respectively, of confirmation image 606. The user refers to confirmation image 606 and thereby can confirm the range of the frame images to be extracted which he or she has specified by using the thumbnail images.

Then, the user operates image extraction start button 606*c* in confirmation image 606. In response, at step S145*b*, PC 500 transmits an image extraction start request to digital camera 100. This image extraction start request contains an image extraction type, the specified first frame number, and the number of frame images to be transmitted. In this exemplary embodiment, the user selects a "partial image extraction" as the image extraction type. After that, PC 500 and digital camera 100 perform the process of FIG. 23.

More specifically, when receiving the image extraction start request, digital camera 100 recognizes that a process of the partial image extraction will be performed, and sets pointer N to the frame number of the first frame image received, at step S151*d*. At step S153*b* digital camera 100 reads and acquires data on an N-th frame image from RAM 150. At step S156, digital camera 100 transmits the acquired data to PC 500. Then, until pointer N reaches the number of frame images specified at step S160*b*, digital camera 100 repeatedly increments pointer N at step S161, extracts an N-th frame image from the 4K photo moving image to generate data on the extracted frame image at step S153*b* and transmits the generated data to PC 500 at step S156.

Figure 24:
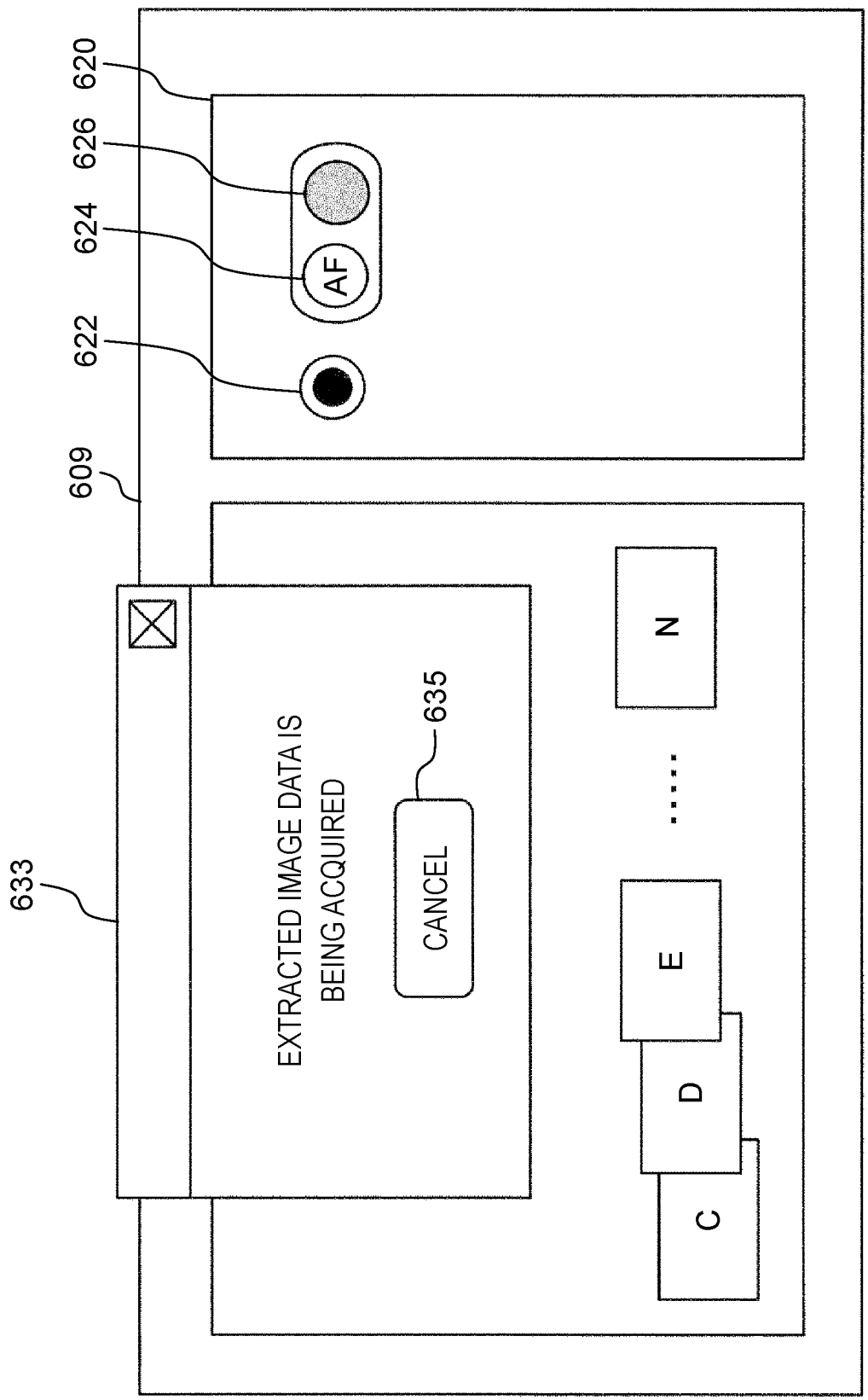
FIG. 24 illustrates an image on the display screen for use in notifying the transmitting of the extracted image data.

During the acquisition of the extracted image data, PC 500 displays image 633, as illustrated in FIG. 24, on operation screen 601 in display unit 513; display image 633 notifies the user that the extracted image data is being acquired. When the user operates cancel button 635 in image 633 (YES at step S165), PC 500 stops acquiring the image data at steps S168, S157, and S158.

The remaining part of the process of FIG. 23 will not be described, because this remaining part is identical to the corresponding part of the process of FIG. 11 in the foregoing first exemplary embodiment. The above configuration enables the user to specify the range of frame images to be extracted while referring to the thumbnail images. Thus, the user can easily confirm the contents of frame images and specify the range of frame images to be extracted. Consequently, imaging system 10 can improve convenience to a user.

Fifth Exemplary Embodiment

Figure 25:
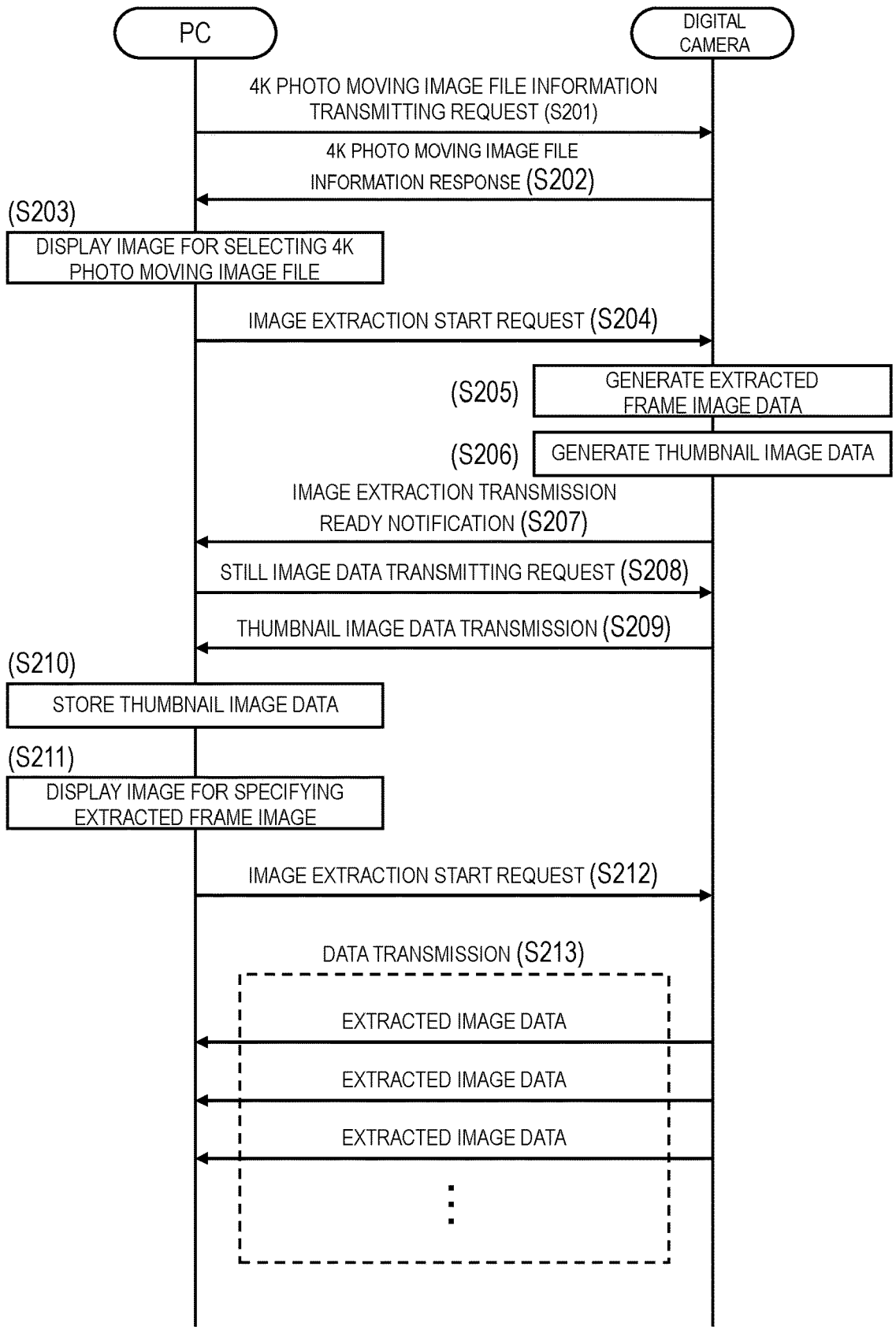
FIG. 25 is a flowchart of a process of transmitting data on extracted images in a fifth exemplary embodiment.

In the first to fourth exemplary embodiments, after having captured a 4K photo moving image, digital camera 100 extracts frame images from the 4K photo moving image and then transmits data on the extracted frame images to PC 500. However, digital camera 100 does not necessarily have to, subsequent to the capturing of the 4K photo moving image, extract frame images and transmit the data on the extracted frame images. Alternatively, at different timings from capturing the 4K photo moving image, digital camera 100 may extract frame images, and transmit the data on the extracted frame images. In the fifth exemplary embodiment, digital camera 100, at any given timing, extracts frame images from a 4K photo moving image that has already been stored, generates data on the extracted frame images, and transmits the generated data to PC 500. Details of this configuration will be described below. FIG. 25 is a sequence diagram illustrating a process performed by imaging system 10 in this exemplary embodiment.

At step S201, PC 500 transmits a request for transmitting 4K moving image file information to digital camera 100. In response to this request, at step S202, digital camera 100 transmits the 4K moving image file information to PC 500. The 4K photo moving image file information contains information on 4K moving image files stored in memory card 160 of digital camera 100. More specifically, the 4K moving image file information contains the following information, as the information on 4K moving image files stored in memory card 160:

a number of 4K moving image files stored in memory card 160;

handle information for use in differentiating between 4K moving image files;

a thumbnail image of a first frame image in each 4K moving image file; and a number of frame images, a number of markers, and marker information in each 4K moving image file.

Figure 26:
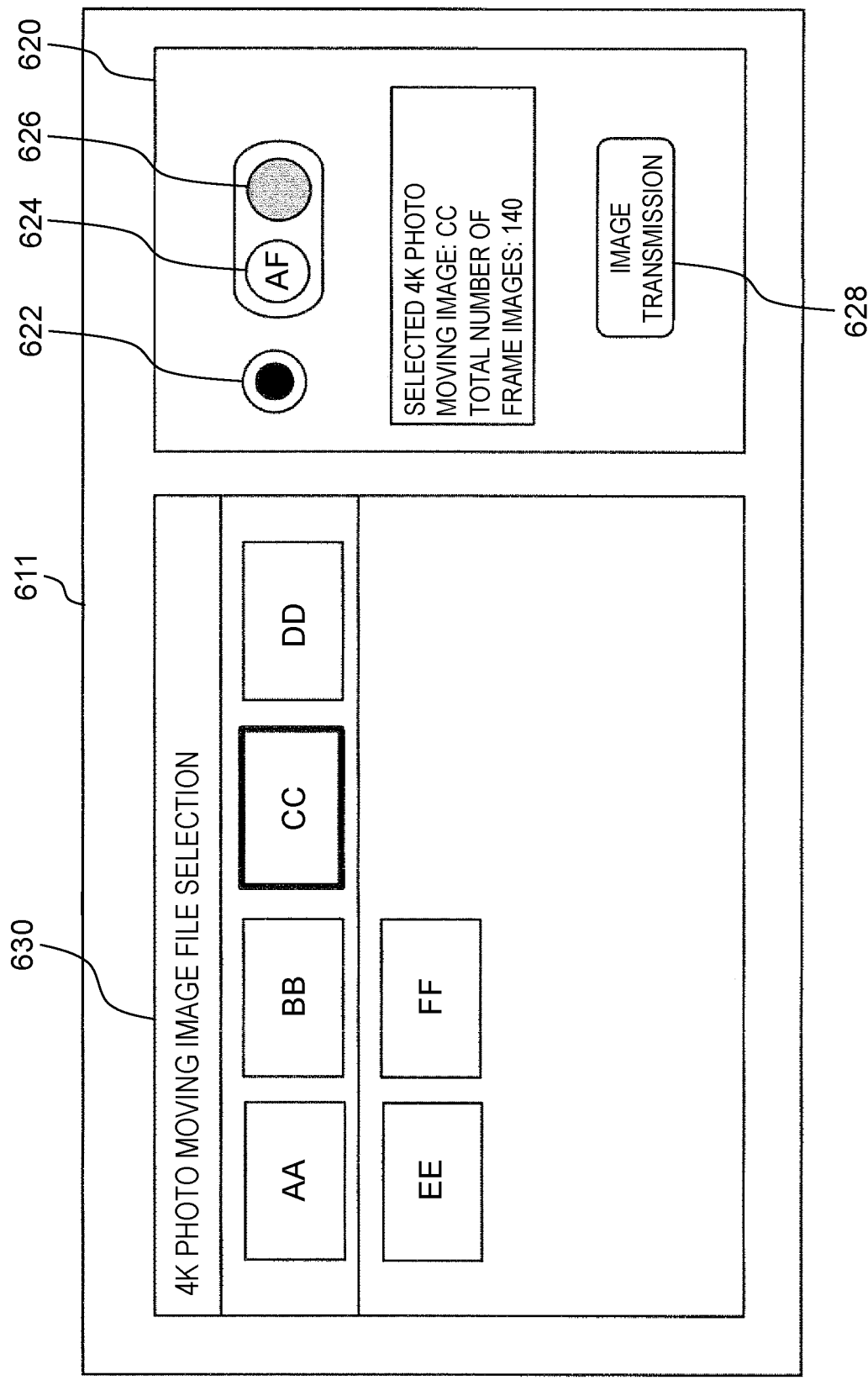
FIG. 26 is an image for use in selecting a 4K moving image file.

When receiving the 4K moving image file information from digital camera 100, PC 500 displays a selection image in display unit 513 through which a user selects a 4K moving image file from which frame images are to be extracted, at step S203. FIG. 26 illustrates selection image 611 as an example of this selection image. In FIG. 26, selection image 611 indicates that six 4K moving image files are stored in memory card 160 of digital camera 100. Selection image 611 in FIG. 26 also indicates that the user has selected a 4K moving image file named "CC" which contains 140 frame images.

When the user selects a desired 4K moving image file through selection image 611 as illustrated in FIG. 26, PC 500 transmits an image extraction start request to digital camera 100 at step S204. This image extraction start request contains an image extraction type (acquisition using thumbnail images), a frame number of a first frame image, a total number of frame images to be transmitted, and handle information for use in identifying the 4K moving image file selected by the user.

When receiving the image extraction start request that has been transmitted at step S204, at step S205, digital camera 100 recognizes that a process of the acquisition using thumbnail images will be performed, then extracts all the frame images from the 4K photo moving image data, and generates data on the extracted frame images. At step S206, digital camera 100 resizes the extracted frame images to generate thumbnail images. Digital camera 100 stores data on the extracted frame images and the generated thumbnail images in a working area of RAM 150.

When completely generates the thumbnail image data, digital camera 100 transmits an image transmission ready notification to PC 500 at step S207. In response to this image transmission ready notification, PC 500 transmits a still image data transmitting request to digital camera 100 at step S208. In response to this still image data transmitting request, digital camera 100 transmits the thumbnail image data on all the frame images to PC 500 at step S209.

When receiving the thumbnail image data from digital camera 100, PC 500 stores this thumbnail image data in data storage unit 517 at step S210. At step S211, PC 500 displays, on operation screen 601 in display unit 513, operation screen 609 containing the thumbnail images, as illustrated in FIG. 20, through which the user specifies a range of frame images to be extracted.

When the user specifies the frame images to be extracted by selecting thumbnail images on operation screen 609, PC 500 transmits an image extraction start request to digital camera 100 at step S212. This image extraction start request contains an image extraction type (partial image extraction), the specified first frame number, and the number of frame images to be transmitted. After that, PC 500 and digital camera 100 perform process steps that are the same as the corresponding process steps of FIG. 23. As a result, digital camera 100 transmits the extracted frame images to PC 500.

Through the above process, digital camera 100 can, at any given timing, extract frame images from the stored 4K photo moving image, generate data on the extracted frame images, and transmit the generated data to PC 500.

Other Exemplary Embodiments

The first to fifth exemplary embodiments have been described as examples of the technique disclosed in the present disclosure. However, the technique of the present disclosure is not limited to these embodiments, but is applicable to other exemplary embodiments including appropriate modifications, substitutions, additions, and omissions. In addition, novel exemplary embodiments can be conceived of by combining some of the constituent elements in imaging system 10 described in the first to fifth exemplary embodiments.

An imaging system may use any given communication protocol for communication between an imaging apparatus and an electronic device outside the imaging apparatus, although the imaging system in each of the foregoing first to fifth exemplary embodiments uses the PTP. Moreover, the imaging system may employ USB communication specifications, as communication specifications between the imaging apparatus and the electronic device disposed outside the imaging apparatus.

In the imaging system, the digital camera may have a lens and a camera body that are integrated with each other, although the digital camera in the foregoing first to fifth exemplary embodiments has an interchangeable lens.

The imaging apparatus of the present disclosure may be any given electronic device other than a digital camera or a camera body. Examples of the imaging apparatus of the present disclosure include video cameras, smartphones, tablet terminals, and other devices that can capture images. The electronic device of the present disclosure is not limited to a PC as in the foregoing first to fifth exemplary embodiments. Examples of the electronic device of the present disclosure device include smartphones, tablet terminals, and other image processing devices.

The exemplary embodiments have been described herein as examples of the technique in the present disclosure. For this purpose, the accompanying drawings and the detailed description have been provided.

Therefore, the components described in the attached drawings and the detailed description include not only the components essential for solving the problem but also components that are not essential for solving the problem in order to illustrate the technique. For this reason, even if these unessential components are described in the accompanying drawings and the detailed description, these unessential components should not be immediately approved as being essential.

Further, since the above-described exemplary embodiments illustrate the technique in the present disclosure, various modifications, substitutions, additions, and omissions can be made within the scopes of claims and their equivalents.

The spirit of the present disclosure is applicable to: an imaging apparatus that can generate moving image data from which still image data is to be extracted; and an electronic device that remotely controls this imaging apparatus.

What is claimed is:

1. An imaging apparatus to be remotely controlled by an electronic device disposed outside the imaging apparatus, the imaging apparatus comprising:
   a communication unit that communicates with the electronic device;
   an imaging unit that captures a moving image of a subject to generate moving image data from which still image data is to be extracted, wherein the moving image includes a plurality of frame images;
   a storage unit that stores, in a recording medium, the moving image data generated by the imaging unit; and
   a control unit that controls an operation of the imaging apparatus, wherein when the imaging apparatus is set to a mode that enables remote control from the electronic device and a predetermined moving image mode, the control unit:
      receives a first request from the electronic device to capture the moving image;
      in response to the received first request, causes the imaging unit to capture the moving image and generate moving image data,
      receives an information request regarding the moving image data from the electronic device after generating the moving image data and, in response to the information request, transmits information regarding the moving image data to the electronic device;
      receives a second request from the electronic device to generate the still image data after transmitting the information regarding the moving image data, the second request being set by using the information regarding the moving image data and,
      in response to the second request, extracts at least one frame image from the moving image data stored in the recording medium, and causes the communication unit to transmit the generated still image data to the electronic device.

2. The imaging apparatus according to claim 1, wherein, in response to the received second request, the control unit performs a process of extracting all frame images making up the moving image data and generating the still image data from all the extracted frame images, and causes the communication unit to transmit the generated still image data to the electronic device.

3. The imaging apparatus according to claim 1, wherein, in response to the received second request, the control unit performs a process of extracting, from the moving image data, the at least one frame image contained in a range specified by the second request and generating the still image data from the extracted frame image, and causes the communication unit to transmit the generated still image data to the electronic device.

4. The imaging apparatus according to claim 1, wherein the control unit receives a third request from the electronic device and, in response to the third request, performs a process of generating, from the moving image data, thumbnail image data corresponding to at least one frame image contained in the moving image data, and causes the communication unit to transmit the generated thumbnail image data to the electronic device.

5. The imaging apparatus according to claim 4, wherein:
   the second request is generated using the thumbnail image data after receiving the third request; and
   in response to the received second request, the control unit:
      performs a process of extracting, from the moving image data, the at least one frame image contained in a range specified by the second request and generating the still image data from the extracted frame image; and
      causes the communication unit to transmit the generated still image data to the electronic device.

6. The imaging apparatus according to claim 1, wherein the communication unit communicates with the electronic device in conformity with a picture transfer protocol (PTP).

7. The imaging apparatus according to claim 1, wherein the communication unit is electrically connected to the electronic device via a universal serial bus (USB) cable.

8. The imaging apparatus according to claim 1 wherein, in response to the received second request, the control unit:
  performs a process of extracting, from the moving image data, the at least one frame image contained in a range specified by the second request and generating the still image data from the extracted frame image; and
  causes the communication unit to transmit the generated still image data to the electronic device.

9. The imaging apparatus according to claim 1 wherein, in response to the received second request, the control unit:
  performs a process of extracting all frame images making up the moving image data and generating the still image data from all the extracted frame images; and
  causes the communication unit to transmit the generated still image data to the electronic device.

10. An electronic device that performs remote control of an imaging apparatus that generates moving image data from which still image data is to be extracted, the electronic device comprising:
  a communication unit that communicates with the imaging apparatus;
  a recording medium in which the still image data generated from the moving image data in the imaging apparatus is retained;
  an operation unit through which a user enters an instruction for the remote control; and
  a control unit that controls an operation of the electronic device, wherein when the imaging apparatus is set to a mode that enables remote control from the electronic device and a predetermined moving image mode, the control unit:
  causing the communication unit to transmit a first request to the imaging apparatus in response to an instruction of starting to capture an image which is entered through the operation unit, the first request being an instruction of generating the moving image data,
  receiving, from the imaging apparatus, a notification that the imaging apparatus is ready to extract at least one frame image from the moving image data stored in the imaging apparatus and, in response to the notification, causing the communication unit to transmit an information request regarding the moving image data to the imaging apparatus,
  receiving, from the imaging apparatus in response to the information request, information regarding the moving image data and causing the communication unit to transmit a second request to the imaging apparatus, the second request being set by using the information regarding the moving image data, and
  receiving the still image data from the imaging apparatus and storing the received still image data in the recording medium, the still image data being generated by the imaging apparatus by extracting at least one frame image from the moving image data in response to the second request.

11. The electronic device according to claim 10, wherein the second request contains information that indicates a range of the at least one frame image to be extracted from the moving image data.

12. The electronic device according to claim 11, wherein the operation unit includes an entry screen through which a specification of the range is entered.

13. The electronic device according to claim 12, wherein the entry screen contains a region through which an initial location of the frame images to be extracted is specified and a region through which a number of frame images to be extracted is specified.

14. The electronic device according to claim 12, wherein the entry screen allows the specification of the range to be entered using a thumbnail image corresponding to at least one frame image contained in the moving image data.

15. A method in which an imaging apparatus to be remotely controlled by an electronic device disposed outside the imaging apparatus transmits image data, the method comprising:
  when the imaging apparatus is set to a mode that enables remote control from the electronic device and a predetermined moving image mode,
  receiving a first request from the electronic device and, in response to the first request, capturing a moving image to generate moving image data;
  receiving an information request regarding the moving image data from the electronic device after generating the moving image data and, in response to the information request, transmitting information regarding the moving image data to the electronic device;
  receiving a second request from the electronic device after transmitting the information regarding the moving image data, the second request being set by using the information regarding the moving image data and, in response to the second request, extracting at least one frame image from the generated moving image data to generate still image data; and
  transmitting the generated still image data to the electronic device.

16. The method according to claim 15, wherein
  the imaging apparatus is configured to capture a moving image in a first moving image mode and capture a moving image in a second moving image mode,
  the predetermined moving image mode is the second moving image mode, and
  the imaging apparatus transmits the generated still image data without transmitting the moving image data to the electronic device.

17. The method according to claim 15, wherein
  the information request is a request for file information regarding the moving image data,
  the information is the file information regarding the moving image data,
  the imaging apparatus receives an extraction start request for a file selected by using the file information after transmitting the file information and, in response to the extraction start request, transmits image data regarding the selected file to the electronic device, and
  the second request received from the electronic device specifies a range of frame images in the selected file to be extracted based on the image data transmitted to the electronic device.

18. The method according to claim 15, wherein
  the information contains a number of frame images regarding the moving image data.

* * * * *